United States Patent
Suganuma

(10) Patent No.: US 8,561,904 B2
(45) Date of Patent: Oct. 22, 2013

(54) OPTICAL APPARATUS

(75) Inventor: Takayoshi Suganuma, Saitama (JP)

(73) Assignee: Enplas Corporation, Saitama (JP)

( * ) Notice: Subject to any disclaimer, the term of this patent is extended or adjusted under 35 U.S.C. 154(b) by 316 days.

(21) Appl. No.: 13/074,562

(22) Filed: Mar. 29, 2011

(65) Prior Publication Data
US 2011/0243463 A1    Oct. 6, 2011

(30) Foreign Application Priority Data
Mar. 30, 2010    (JP) .................................. 2010-078115

(51) Int. Cl.
G06K 7/10    (2006.01)

(52) U.S. Cl.
USPC ........................................................ 235/457

(58) Field of Classification Search
USPC ............... 235/435, 454, 457, 462.01, 462.32, 235/462.34
See application file for complete search history.

(56) References Cited

U.S. PATENT DOCUMENTS

| | | | | |
|---|---|---|---|---|
| 5,384,453 A | * | 1/1995 | Peng | 235/462.38 |
| 5,805,315 A | * | 9/1998 | Iwamatsu et al. | 359/18 |
| 2006/0102826 A1 | * | 5/2006 | Horiyama | 250/201.5 |
| 2007/0108290 A1 | | 5/2007 | Kikuchi | |
| 2009/0302122 A1 | * | 12/2009 | Begon | 235/494 |

FOREIGN PATENT DOCUMENTS

JP    2009-520249 T    5/2009

* cited by examiner

*Primary Examiner* — Seung Lee
(74) *Attorney, Agent, or Firm* — Washida & Associates

(57) ABSTRACT

Disclosed is an optical apparatus that allows a target pattern to be imaged adequately at low cost and allows the apparatus to be miniaturized. With this optical apparatus (1), light L output from one light source (2) is collimated through a collimation lens (3) and divided into first light beams $L_{1L}$ and $L_{1R}$ by a diffractive optical element (4), and, by a computer-generated hologram (5), first light beams $L_{1L}$ and $L_{1R}$ are each divided into second light beams $L_{2LO}$, $L_{2LI}$, $L_{2RI}$ and $L_{2RO}$, and these second light beams $L_{2LO}$, $L_{2LI}$, $L_{2RI}$ and $L_{2RO}$ form a guide pattern whereby whether or not a focused state is achieved cane be decided.

10 Claims, 23 Drawing Sheets

US 8,561,904 B2

OPTICAL APPARATUS

CROSS REFERENCE TO RELATED APPLICATIONS

The disclosure of Japanese Patent Application No. 2010-078115, filed on Mar. 30, 2010, including the specification, drawings and abstract, is incorporated herein by reference in its entirety.

TECHNICAL FIELD

The present invention relates to an optical apparatus. More particularly, the present invention relates to an optical apparatus that is suitable for assisting imaging of a target pattern for recognizing target pattern information.

BACKGROUND ART

An information recognition apparatus, such as a barcode scanner, for reading a pattern subject to information recognition, such as a one-dimensional code and two-dimensional code (hereinafter referred to as "target pattern"), by means of imaging, and interpreting the information of the read target pattern, has been known heretofore.

It is important for an information recognition apparatus of this kind to image a target pattern adequately, in a state focus is adjusted with respect to a target pattern, in order to interpret the information of the target pattern reliably.

The technology disclosed in patent literature 1, for example, is known as a technique to assist this reading of target pattern information.

In patent literature 1, in order to allow the view at the focal distance to be determined in a convenient fashion and at low cost, guiding light beams are output to a plane where a symbol is formed, so that, when the plane comes to an optimal position to read that symbol, an image is formed in a state in which a prescribed shape is shown on that plane.

Patent Literature

PTL 1: Published Japanese Translation No. 2009-520249 of the PCT International Publication

SUMMARY OF INVENTION

However, according to patent literature 1, a plurality of light sources need to be provided in order to output guiding light beams, and this increases the cost required for the light sources, and, given that these light sources need to be arranged at certain intervals, it is difficult to miniaturize the apparatus.

Given the above problem, it is therefore an object of the present invention to provide an optical apparatus that enables adequate imaging of a target pattern at low cost and that makes possible miniaturization of the optical apparatus.

An optical apparatus according to the present invention, upon imaging a target pattern that comprises characters, numeric values, numbers, or an arrangement of these and carries predetermined information, by means of an imaging apparatus, projects on a pattern forming plane where the target pattern is formed a guide pattern that is projected to show a normal shape on the pattern forming plane only when the imaging apparatus is in a focused state with respect to the pattern forming plane, as a light projection pattern for determining a location of the imaging apparatus in an optical axis direction with respect to the pattern forming plane, and this optical apparatus comprises: one light source that outputs light; a collimation lens that collimates the light output from the light source; a diffractive optical element that divides the light collimated through the collimation lens into a plurality of first light beams to travel in varying directions; and a computer-generated hologram that divides the plurality of first light beams each into a plurality of second light beams, and outputs these plurality of second light beams of each first light beam in varying directions such that the second light beams of each first light beam are projected on the pattern forming plane in a state said second beams of each first light beam overlap the second beams of another first light beam only in the focused state, wherein: the second light beams of each first light beam are formed to show a predetermined shape to match the guide pattern after being output from the computer-generated hologram; and the guide pattern is formed when the second light beams of each first light beam are projected on the pattern forming plane.

With the present invention, it is possible to enable adequate imaging of a target pattern at low cost and also enable miniaturization of an apparatus.

DESCRIPTION OF EMBODIMENTS

Now, an embodiment of the present invention will be described in detail with reference to the accompanying drawings.

The optical apparatus of the present embodiment is mounted on an information recognition apparatus that is designed to be able to interpret information of a target pattern comprised of characters, numeric values, numbers, or combinations of these, and carrying predetermined information, and is used for the interpretation of target pattern information by this information recognition apparatus. A barcode scanner, which interprets one-dimensional code or two-dimensional code information as a target pattern, is an example of an information recognition apparatus. A handheld barcode scanner may be used.

Figure 1:
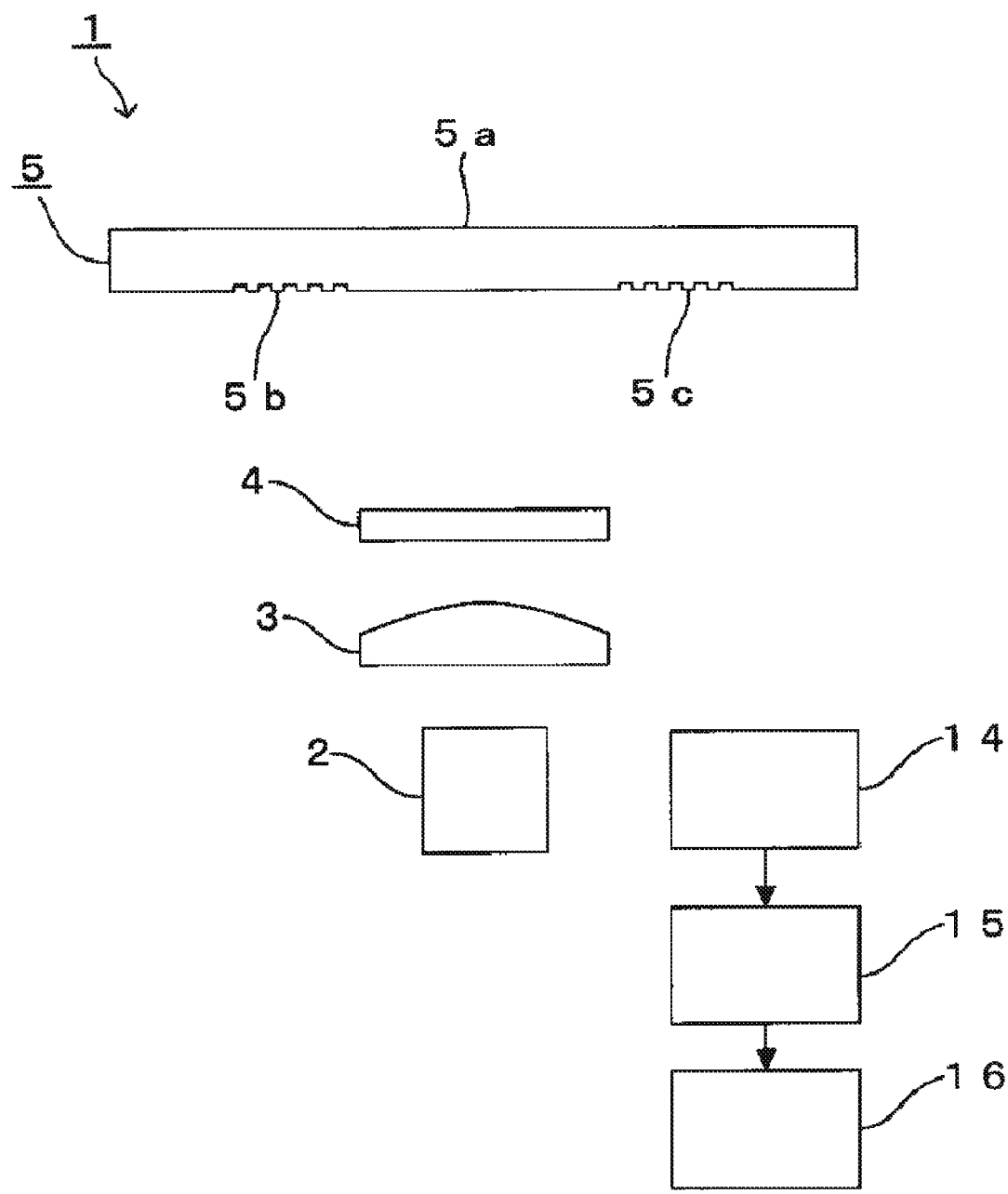
FIG. 1 shows a configuration of an optical apparatus according to an embodiment of the present invention.
Figure 2:
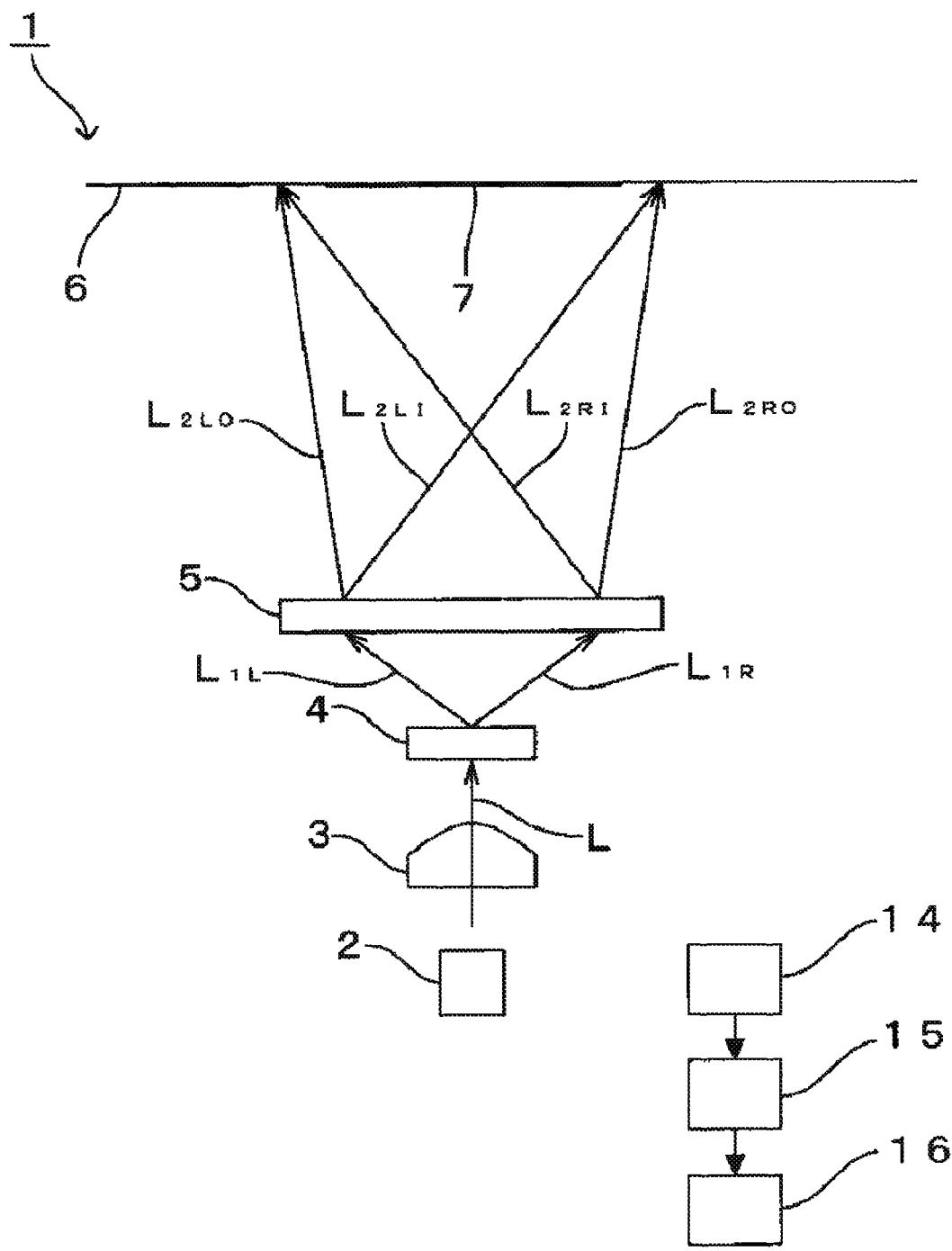
FIG. 2 shows a configuration of an optical apparatus according to an embodiment of the present invention and an optical path.

Then, FIG. 1 and FIG. 2 shows detailed configurations of an optical apparatus according to the present embodiment applied to such information recognition apparatus.

With optical apparatus 1 of the present embodiment, when an imaging apparatus (not shown) images a target pattern, a guide pattern is projected on a pattern forming plane on which the target pattern is formed over a predetermined range. Note that a guide pattern refers to a light projection pattern that is projected on a pattern forming plane to determine the location of an imaging apparatus in an optical axis direction with respect to the pattern forming plane, and refers to a pattern to be projected in a state a normal shape is shown on the pattern forming plane only when the imaging apparatus is in a focused state with respect to the pattern forming plane.

Furthermore, a pattern forming plane is, for example, a printed surface on which a barcode is printed, a surface on which a sticker with a printed barcode is placed (i.e. product wrapping), and so on. Also, a focused state refers to a state in which the focus of an imaging apparatus on the subject side matches completely with one point on a pattern forming plane, or a state equivalent to this. As for the relationships of the locations of and the distance between the focus of an imaging apparatus on the object side and a pattern forming plane, in the event the above focused state is found, adequate relationships may be set depending on the underlying concept. Consequently, with the present embodiment, the location of an imaging apparatus in an optical axis direction with respect to a pattern forming plane, at which a focused or equivalent state is achieved, is not limited to a single fixed location, and locations in a certain range of variation are possible. Also, as will be described later in detail, the normal shape of a guide pattern may assumes shapes in a certain range of variation, and, for example, the line width varies depending on the distance between an imaging apparatus and a pattern forming plane.

As shown in FIG. 1 and FIG. 2, optical apparatus 1 of the present embodiment has laser light source 2 as a light source. This laser light source 2 outputs laser light L (see FIG. 2), which widens ahead (upward in FIG. 1 and FIG. 2) to a predetermined angle. This laser light source 2 may be a light outputting diode (LED) or a semiconductor laser (LD).

Also, as shown in FIG. 1 and FIG. 2, in a location on the laser light L outputting side with respect to laser light source 2, plano-convex collimation lens 3 is placed a predetermined space apart from laser light source 2. Laser light L output from laser light source 2 is incident on this collimation lens 3. Then, collimation lens 3 collimates (makes parallel) incident laser light L and outputs the result forward.

Furthermore, as shown in FIG. 1 and FIG. 2, in a location on the laser light L outputting side with respect to collimation lens 3, first computer-generated hologram 4, which serves as a diffractive optical element, is placed a predetermined space apart from collimation lens 3, to be parallel to the optical axis of collimation lens 3. Laser light L, which is collimated through collimation lens 3, is incident on this first computer-generated hologram 4, as a Gaussian beam having a predetermined mode field diameter. Then, by means of a diffraction effect, first computer-generated hologram 4 divides incident laser light L into two first light beams $L_{1L}$ and $L_{1R}$ (see FIG. 2), which are directed to two different directions and which have substantially equal quantities of light. Then, two first light beams $L_{1L}$ and $L_{1R}$ are output from first computer-generated hologram 4, at substantially equal diffraction angles between the left and right. Hereinafter, where necessary, first light beam $L_{1L}$—that is, the one that travels forward to the left from first computer-generated hologram 4 (upper left in FIG. 2)—will be referred to as "left first light beam $L_{1L}$," and first light beam $L_{1R}$—that is, the other one that moves forward to the right from first computer-generated hologram 4 (upper right in FIG. 2)—will be referred to as "right first light beam $L_{1R}$."

In a location a specific distance ahead of first computer-generated hologram 4, two first light beams $L_{1L}$ and $L_{1R}$ output from first computer-generated hologram 4 become Gaussian beams having substantially an equal mode field diameter to that of laser light L upon incidence on first computer-generated hologram 4.

These two first light beams $L_{1L}$ and $L_{1R}$ are realized in optimized phase distributions set up in first computer-generated hologram 4.

Generally speaking, a computer-generated hologram is known as an element to change a light of a coherent light source to a light of a specific field strength distribution originally targeted at, by using a diffraction phenomenon. This computer-generated hologram can usually be designed by the technique called "iterative Fourier transform method" (IFTA: Iterative Fourier Transform Algorithm). "Iterative Fourier transform method" is a general term for algorithms for optimization calculation for computer generated holograms, and, to be more specific, algorithms of the GerchBerg-Saxton method and direct binary search method, genetic algorithms, and so on are often used.

Also, in the field of wave optics, the propagation of light differs from ray tracing and can be calculated by the angular spectrum propagation method, Fourier propagation method, Fresnel propagation method, Rayleigh-Sommerfeld method, and so on. Which calculation method is used depends on calculation capacity, light propagation distance, and so on.

Figure 3:
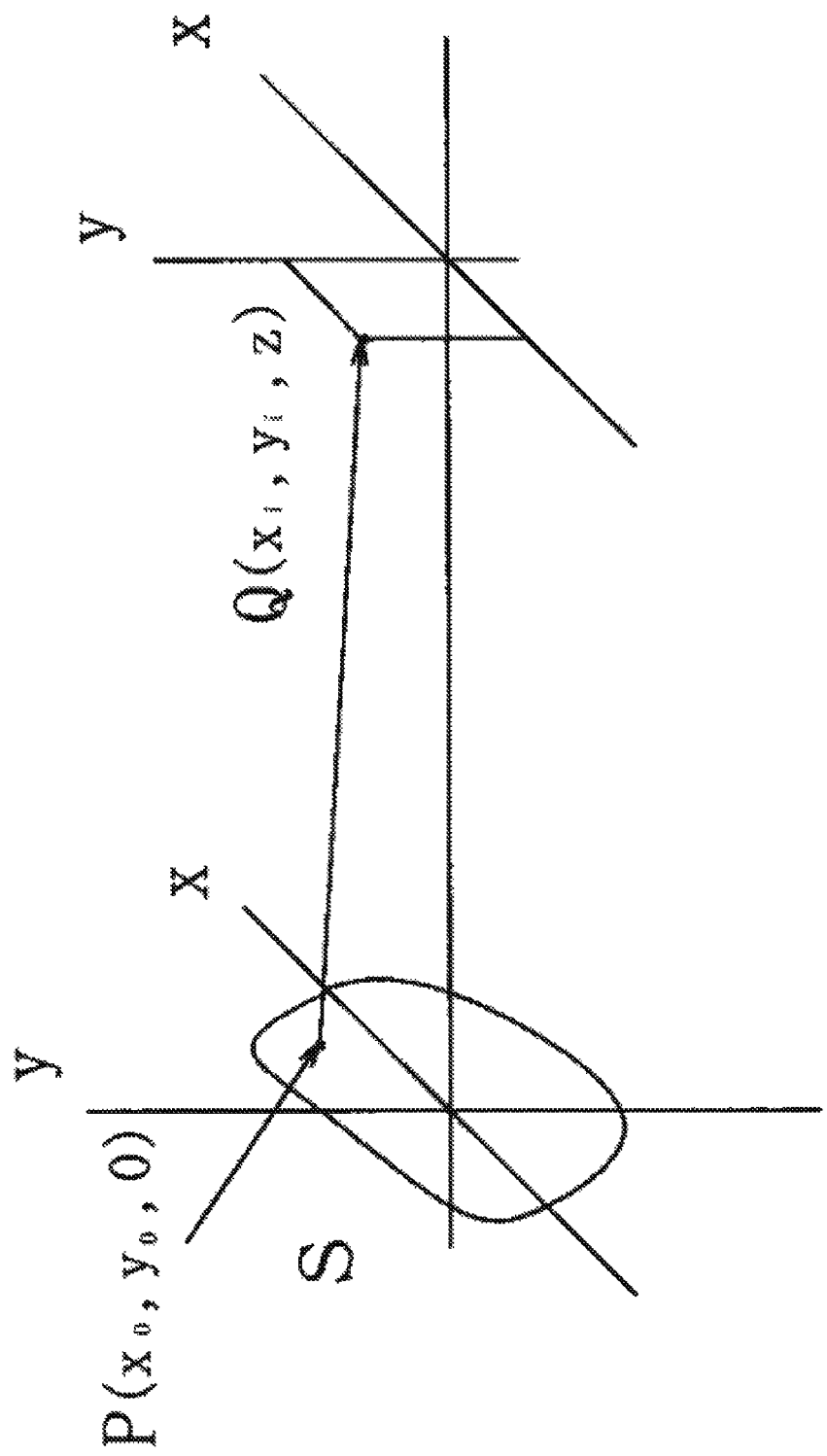
FIG. 3 is a first illustration for explaining a light propagation equation with an optical apparatus according to an embodiment of the present invention.

Equations (1) to (3) are known as equations related to the propagation of light. That is to say, first, assume aperture surface S shown in FIG. 3, and also assume one point $P(x_0, y_0, 0)$ in this aperture surface S. Also, assume point $Q(x_i, y_i, z)$ on an xyz plane which is z apart from aperture surface S. Then, the intensity of light which the light to pass point P produces in point Q is $(1/j\lambda) \cdot E(x_0, y_0) \exp(-jkr/r)$, from the Huygens-Fresnel equation. Note that $r = z[1 + \{(x_i - x_0)/z\}^2 + \{(y_i - y_0)/z\}^2]^{0.5} \approx z + (\frac{1}{2}z) \cdot [(x_i - x_0)^2 + (y_i - y_0)^2] - (\frac{1}{8}z^3) \cdot [(x_i - x_0)^2 + (y_i - y_0)^2]^2 = z + (x_i^2 + y_i^2)/2z - (x_0 x_i + y_0 y_i)/z + (x_0^2 + y_0^2)/2z - \ldots$ . Then, the intensity of light $E(x_i, y_i)$ which the light to pass entire aperture surface S produces in point Q, is found by integrating the intensity of light which the light to pass point P produces in point Q, over the entire area of aperture surface S. The result of this integration is given by equation 1.

$$E(x_i, y_i) = (1/j\lambda) \cdot \iint E(x_0, y_0) \exp(-jkr/r) dx_0 dy_0 \qquad \text{(Equation 1)}$$

Note that, in the range where propagation distance $Z < D/\lambda$ (D: aperture diameter, and $\lambda$: wavelength), next equation 2 holds, which is referred to as "Fresnel propagation equation."

$$E(x_i, y_i) = \exp(jkz)/(j\lambda z) \exp(jk(x_i^2 + y_i^2)/(2z)) \cdot \iint E(x_0, y_0) \exp(j\pi/\lambda z (x_0^2 + y_0^2)) \exp((-j2\pi/\lambda z) x_0 x_i + y_0 y_i) dx_0 dy_0 \qquad \text{(Equation 2)}$$

On the other hand, in the range where propagation distance $Z > D/\lambda$, next equation 3 holds, which is referred to as "Fourier propagation equation."

$$E(x_i, y_i) = (\exp(jkz)/(j\lambda z)) \exp(jk/2z)(x_i^2 + y_i^2) \iint E(x_0, y_0) \exp(-2\pi^{j/\lambda z})(x_0 x_i + y_0 y_i) dx_0 dy_0 \qquad \text{(Equation 3)}$$

The above formulization in relationship to a Fourier optical system is described in detail in *Introduction to Fourier Optics* by Goodman (Roberts & Co., 3rd ed.).

Next, the iterative Fourier transform method will be described as one example of a specific method of designing a computer-generated hologram.

First, generally speaking, it is well settled that, with a coherent light source such as a laser, especially when the horizontal mode is single mode, the field strength distribution represented by following equation 4, which is referred to as "single mode Gaussian distribution" is formed.

$$E(x, y) = \exp(-(x^2 + y^2/w_0))^2 \qquad \text{(Equation 4)}$$

Figure 4:
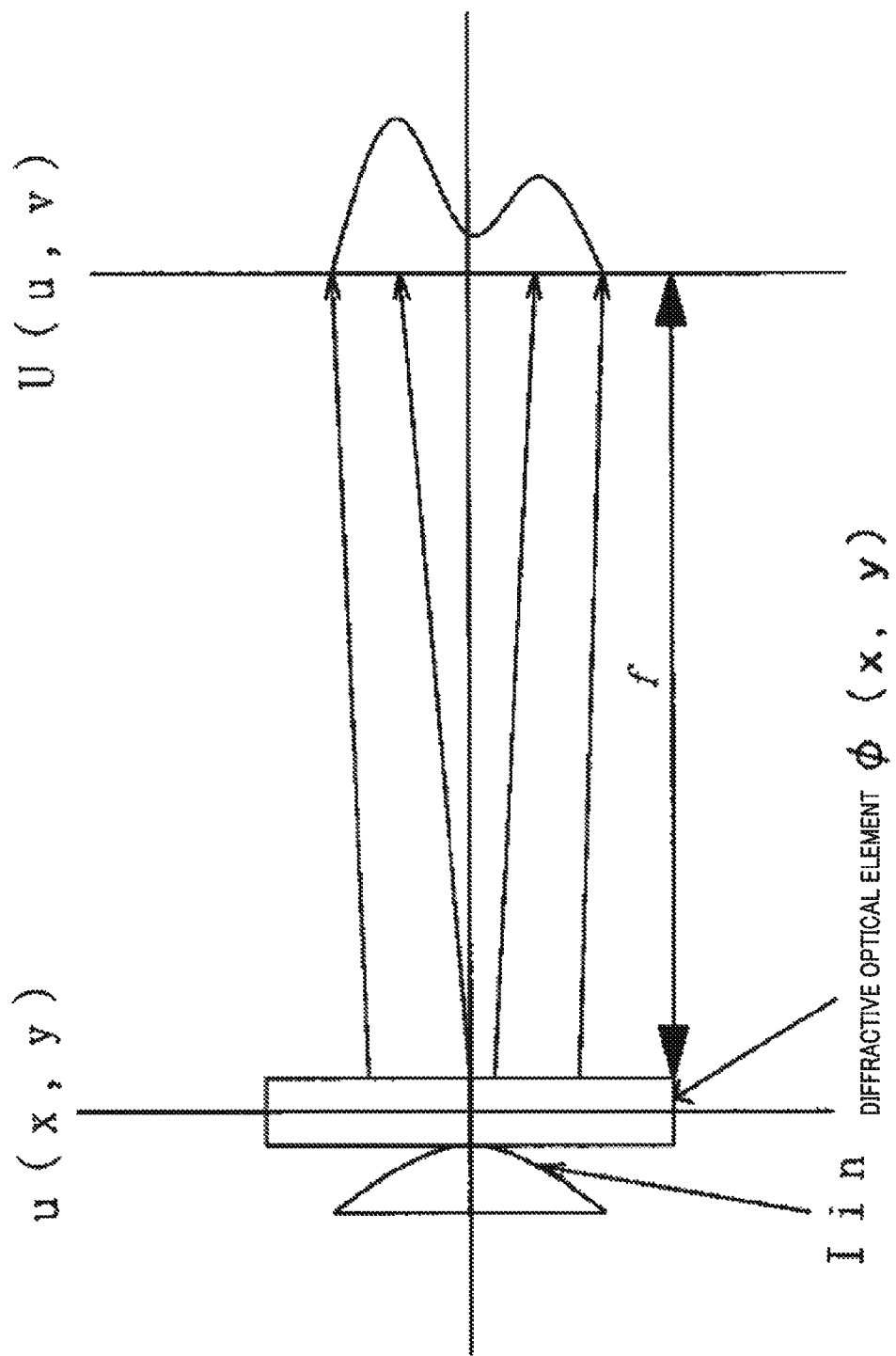
FIG. 4 is a second illustration for explaining a light propagation equation with an optical apparatus according to an embodiment of the present invention.

Then, assume that a diffractive optical element having only a phase distribution, is placed immediately after this Gaussian distribution. Furthermore, assume that there is an image plane in a location that is distance f apart from the light source, and that the target field strength distribution is realized on that image plane. FIG. 4 illustrates this. In FIG. 4, u(x,y) is the field strength distribution of light on a physical plane where an incident light source is present. Note that u is generally represented by a complex number.

Furthermore, if the phase of the diffractive optical element in FIG. 4 is $\phi(x,y)$, the field of light immediately after this diffractive optical element is represented as: $u(x,y) = |u(x,y)| \cdot \exp(\phi(x,y))|$. Note that the field strength of u(x,y) is the square root of amplitude distribution $I_{in}(x,y)$ of laser light incident on the diffractive optical element. Also, referring to FIG. 4, assume that the surface of the diffractive optical element on the object side (hereinafter referred to as "DOE surface") is placed in the same location as that of the light source in the z-axis direction. Then, the light exiting the diffractive optical element forms an image as a light having been subjected to the Fourier transform, on an image plane that is distance f apart from the light source. The field distribution U of light (that is, light having been subjected to the Fourier transformed) on the image plane can be represented as:

$$U(x,y) = |U(u,v)| \cdot \exp(j \cdot \phi(u,v)).$$

Also, assume that the target field strength distribution on the image plane (Fourier plane) is $I_{obj}(u,v)$.

Here, in the course of the iterative calculation (repetitive calculation) of the iterative Fourier transform method, U(u,v) should eventually become $I_{obj}(u,v)$ in the end. Note that u(x,y) and U(u,v) form a Fourier transform pair.

Then, based upon the above assumptions, the optimal final phase $\phi(x,y)$ solution of the diffractive optical element is determined by an iterative calculation by the iterative Fourier transform method.

Figure 5:
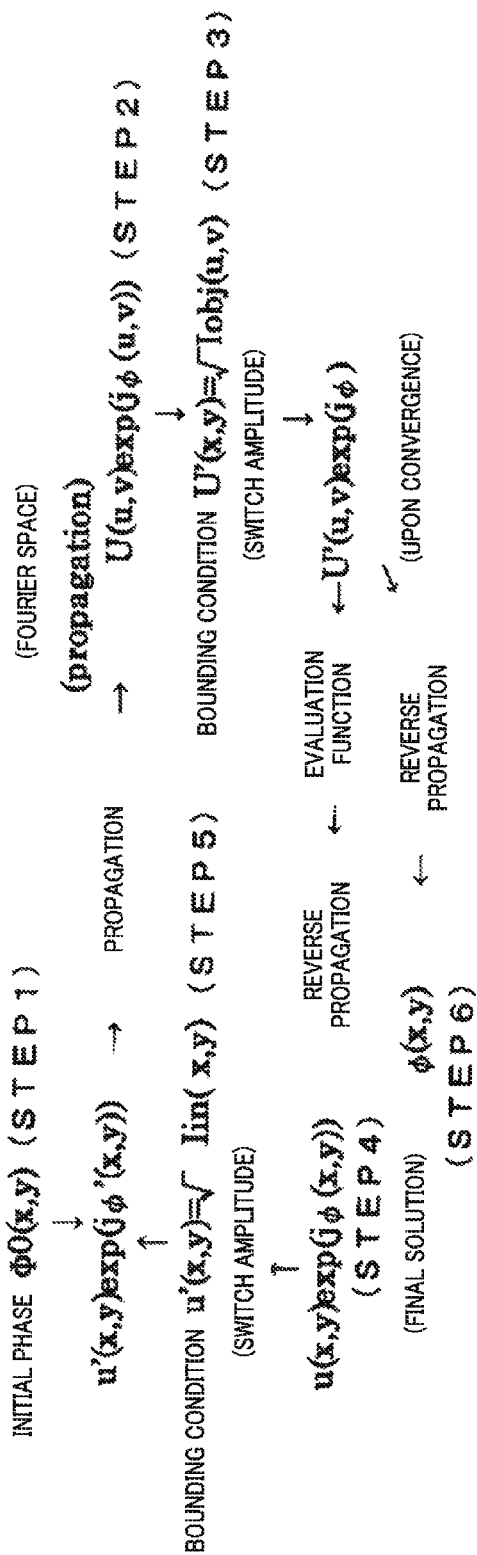
FIG. 5 shows the steps of a specific method of designing a computer-generated hologram with an optical apparatus according to an embodiment of the present invention.

A flowchart of this iterative calculation by the iterative Fourier transform method is shown in FIG. 5.

That is to say, as shown in FIG. 5, the algorithm of an iterative calculation starts from initial phase $\phi_0(x,y)$ (see STEP 1 in FIG. 5). At this time, $Re(u(x,y)) = \sqrt{I_{in}}(x,y)$, from the setup of incident light. Note that Re is the real number component of the function. Furthermore, $I_{in}(x,y)$ is the field strength distribution of laser light that is incident on the diffractive optical element.

On the other hand, immediately after passing diffractive optical element, $U(x,y) = |(U(x,y))| \cdot \exp(\phi(x,y))$. Note that, generally, U(x,y) is a complex number function.

Next, by applying the Fourier Transform to u(x, y), an image plane after propagation is acquired, and $U(u, v) \cdot \exp(j\phi(u, v))$ is given (see STEP 2 in FIG. 5).

Next, on the Fourier plane of (u,v), U(u,v) is replaced by target field strength distribution $U'(u,v) = \sqrt{I_{obj}}(u,v)$ (see STEP 3 in FIG. 5).

Hereinafter, by performing an inverse Fourier transform after an evaluation is made as to how close a target image plane has approached using a merit function, it is possible to find function $u(x,y) \cdot \exp(j\phi(x,y))$ on the DOE surface (see STEP 4 in FIG. 5).

Next, on the DOE surface, $u(x,y) \cdot \exp(j\phi(x,y))$ is replaced by u(x,y) in $(x,y) \cdot \exp(j\phi(x,y))$, by $u'(x,y) = \sqrt{I_{in}}(x,y)$ (see STEP 5 in FIG. 5). In this calculation loop, a bounding condition by replacement is applied to both the DOE surface and the image plane.

Then, this iterative calculation is performed, and, when U'(u,v) on the DOE surface is decided to have approached close enough to function $\sqrt{I_{obj}}(u,v)$ representing the target field strength distribution, the calculation is finished.

Now, to evaluate how close $\sqrt{I_{obj}}(u,v)$ and U'(u,v) have approached each other, generally, an evaluation function to represent the difference between these two functions is set, and the calculation is finished when the difference value represented by the evaluation function set, is smaller than a predetermined setting value.

In this calculation, if the difference between the two functions is significantly large, an inverse Fourier transform is further applied to $U'(x,y) \cdot \exp(j\phi(u,v))$ to find $u(x,y) \cdot \exp(j\phi(x,y))$ once again, and then u(x,y), which represents the strength distribution, is replaced by incident light intensity $\sqrt{I_{in}}$. By this means, an iterative calculation is carried out continuously.

Then, as shown in FIG. 5, by repeating the loop several tens of rotations, target phase distribution φ(x,y) can be found (STEP 6).

The algorithm shown in FIG. 5 is known as a Gerchberg-Saxton algorithm. This Gerchberg-Saxton algorithm is described in *Applied Optics* published by OSA (July 1989 Vol. 28, No. 13, p 2641-2650).

As described above, an optimal phase distribution solution to make possible a target field strength distribution on an image plane can be found by a Gerchberg-Saxton algorithm. As an actual method of making a computer-generated hologram to realize such a phase distribution solution, for example, the method of forming a refractive index distribution, in which the refractive index changes on a location-specific basis, on a thin translucent substrate, the method of forming recesses and projections on a transparent substrate, and other methods are known.

Now, with a computer-generated hologram of a type that makes possible the above-described optimal phase distribution solution by forming recesses and projections on the surface of a transparent substrate, the relation equation represented by equation 5 below holds.

$$h=(\lambda/2\pi)\times\psi/(n-1) \quad \text{(Equation 5)}$$

Note that h in equation 5 is the physical depth [μm] of the recesses in the recesses and projections in a computer-generated hologram, from a reference plane. Also, λ in equation 5 is the wavelength of light [μm] passing a computer-generated hologram. Furthermore, ψ in equation 5 is the phase of a computer-generated hologram [rad]. Furthermore, also, n in equation 5 is the refractive index of the substrate medium constituting the computer-generated hologram.

Then, as a specific method of making such a computer-generated hologram, the method of applying a photoresist or an electron beam exposure resist on the surface of a crystal substrate and then performing mask exposure by an exposure apparatus using UV light such as an i-line stepper, the method of forming a specific pattern made from a resist by performing exposure using an EB drawing apparatus and then performing developing, and other methods are known. Here, a crystal computer-generated hologram can be itself used as a product, but it is also possible to make a large number of duplicates on a resin substrate by using this hologram as a master and using fast transcription technologies such as nano-imprinting and hot embossing processing. Also, the substrate to form recesses and projections (micro structures) on first is generally crystal or Si, as mentioned earlier, but, in addition to these, glass, ceramic and so forth may be used as long as these are transparent dielectric materials.

A phase solution distribution to be determined through calculation is generally an analogue solution created from a curved plane where phase keeps changing gradually in a range between 0 and 2π, but from a manufacturing perspective, it is difficult to realize such a phase solution. Consequently, in actuality, shape approximation is oftentimes carried out, whereby a phase solution that is determined through calculation is divided into pixels of squares on an xy plane and the height in the z direction is represented in $2^n$ levels such as eight levels and sixteen levels. A hologram formed with pixels such as this (that is, a computer-generated hologram) is called a digital hologram, as opposed to an analogue hologram. A digital computer-generated hologram such as this has an advantage of enabling comparatively easy manufacturing using semiconductor manufacturing processes based on lithography and dry etching.

Also, generally, a diffractive optical element holds true the following law, if the wavelength of light to use is λ [μm], the period size of the diffractive optical element is Λ [μm], the order of diffraction is n, and the angle of diffraction is θ [°].

$$\Lambda \cdot \sin\theta = n \cdot \lambda \quad \text{(Equation 6)}$$

Note that, in equation 6, in particular, if the order of diffraction is limited to positive and negative one, a simpler equation, $\Lambda \cdot \sin\theta = \lambda$, is provided.

This equation 6 is applicable to a computer-generated hologram, and, in that case, the pixel size of the above-mentioned digital computer-generated hologram may be substituted in the place of Λ, and the output angle of light from the computer-generated hologram may be substituted in the place of θ.

Then, given first computer-generated hologram 4 designed as described above, furthermore, as shown in FIG. 1 and FIG. 2, optical apparatus 1 provides second computer-generated hologram 5, which is placed parallel to and a predetermined space apart from first computer-generated hologram 4, in a location on the outputting side of first light beams $L_{1L}$ and $L_{1R}$ with respect to first computer-generated hologram 4.

As shown in FIG. 1, second computer-generated hologram 5 has transparent substrate 5 and provides on this transparent substrate 5 a pair of left and right optical function sections 5b and 5c that are formed a predetermined space apart from each other horizontally in FIG. 1. Optical function sections 5b and 5c are parts in second computer-generated hologram 5 that have the optical functions to be described later (optical division function and beam shaper function).

In a location that is a specific distance ahead of first computer-generated hologram 4, two first light beams $L_{1L}$ and $L_{1R}$ become Gaussian beams having substantially the same mode field diameter as laser light L upon incidence on hologram 4.

Based on the above assumptions, left optical function section 5b in a pair of optical function sections 5b and 5c is placed in a location on the optical path of left first light beam $L_{1L}$, where the traveling distance of this left first light beam $L_{1L}$ from first computer-generated hologram 4 reaches a specific distance. Similarly, right optical function section 5c in a pair of optical function sections 5b and 5c is placed in a location on the optical path of right first light beam $L_{1R}$, where the traveling distance of this right first light beam $L_{1R}$ from first computer-generated hologram 4 reaches a specific distance.

Consequently, left first light beam $L_{1L}$ output from first computer-generated hologram 4 is incident on left optical function section 5b of second computer-generated hologram 5, as a Gaussian beam having substantially the same mode field diameter as that of laser light L upon incidence on first computer-generated hologram 4. Also, right first light beam $L_{1R}$ output from first computer-generated hologram 4 is incident on right optical function section 5c of second computer-generated hologram 5, as a Gaussian beam having substantially the same mode field diameter as that of laser light L upon incidence on first computer-generated hologram 4.

Then, first light beams $L_{1L}$ and $L_{1R}$, incident on optical function sections 5b and 5c, are each divided into two, totaling in four second light beams $L_{2LO}$, $L_{2LI}$, $L_{2RI}$ and $L_{2RO}$, and these four second light beams $L_{2LO}$, $L_{2LI}$, $L_{2RI}$ and $L_{2RO}$ are output in varying output directions. Second light beam $L_{2LO}$ is the outer left light beam divided from left first light beam $L_{1L}$. Also, second light beam $L_{2LI}$ is the inner left light beam divided from first left beam light $L_{1L}$. This inner left second light beam $L_{2LI}$ is produced in a location that is a horizontally inner (right) location in FIG. 1 and FIG. 2, near the location where outer left second light beam $L_{2LO}$ is produced (divided). Second light beam $L_{2RI}$ is the inner right light beam divided from right first light beam $L_{1R}$. Also, second light beam $L_{2RO}$ is the inner right light beam divided from first right beam light $L_{1R}$. This inner right second light beam $L_{2Ro}$ is produced in a location that is a horizontally outer (right) location in FIG. 1 and FIG. 2, near the location where inner right second light beam $L_{2RI}$ is produced (divided).

Note that the location where outer left second light beam $L_{2LO}$ is produced and the location where inner left second light beam $L_{2LI}$ is produced are very close, so that FIG. 2 looks as though $L_{2LO}$ and $L_{2LI}$ were produced at the same point. Similarly, the location where outer left second light beam $L_{2RO}$ is produced and the location where inner left second light beam $L_{2RI}$ is produced are very close, so that FIG. 2 looks as though $L_{2RO}$ and $L_{2RI}$ were produced at the same point.

Figure 6:
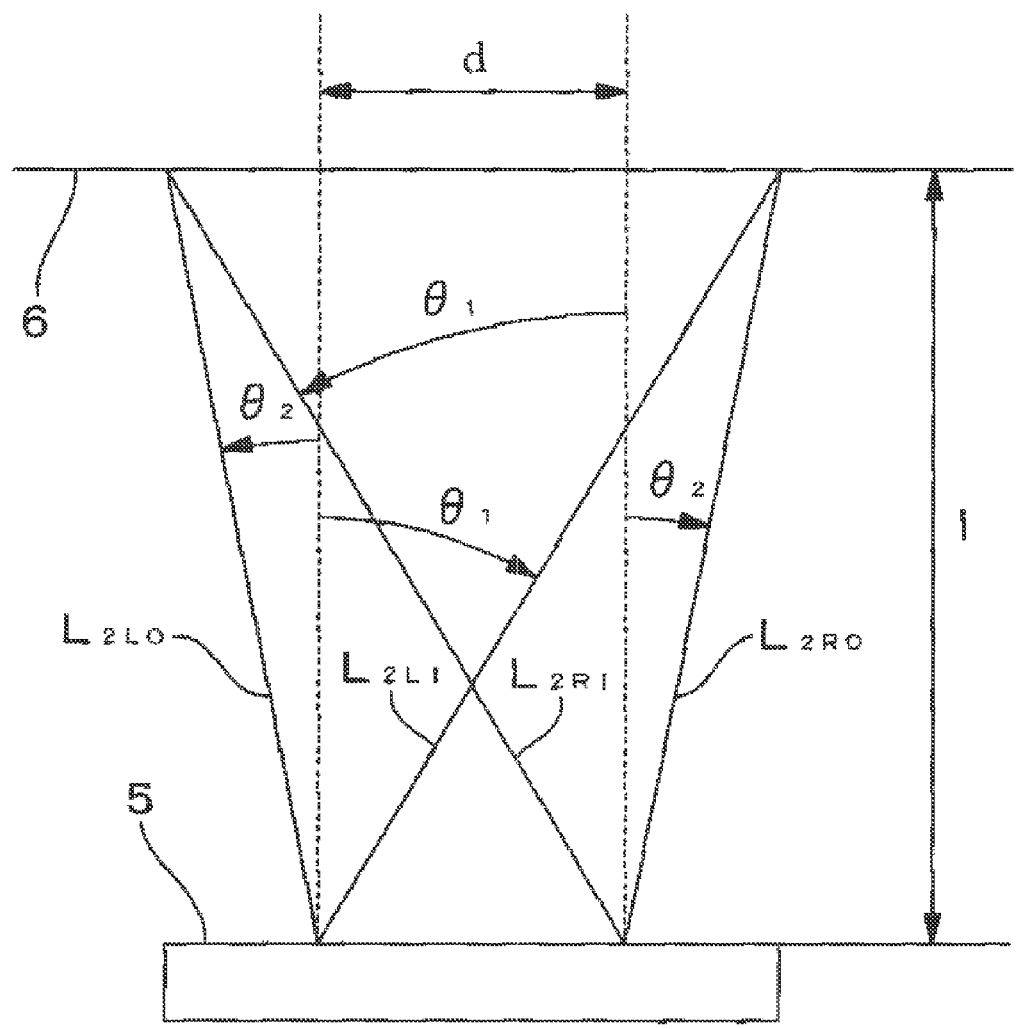
FIG. 6 is a schematic view showing an ideal distance from a second computer-generated hologram to a pattern forming plane, with an optical apparatus according to an embodiment of the present invention, with second light output directions.

FIG. 6 shows the specific output directions of these second light beams $L_{2LO}$, $L_{2LI}$, $L_{2RI}$ and $L_{2RO}$ from second computer-generated hologram 5. That is to say, as shown in FIG. 6, outer left second light beam $L_{2LO}$ is output in the direction of angle $\theta_2°$ (diffraction angle), to the left front (upper left in FIG. 6) from the output location of second computer-generated hologram 5. Also, as shown in FIG. 6, inner left second light beam $L_{2LI}$ is output in the direction of angle $\theta_1°$, to the right front (upper right in FIG. 6) from the output location of second computer-generated hologram 5.

Furthermore, as shown in FIG. 6, inner right second light beam $L_{2RI}$ is output in the direction of angle $\theta_1°$, to the left front from the output location of second computer-generated hologram 5. Furthermore, as shown in FIG. 6, outer right second light beam $L_{2RO}$ is output in the direction of angle $\theta_2°$, to the right front from the output location of second computer-generated hologram 5.

Note that the reference output angle ($\theta°$) for second light beams $L_{2LO}$, $L_{2LI}$, $L_{2RI}$ and $L_{2RO}$ is the front of second computer-generated hologram 5. The output directions of these second light beams $L_{2LO}$, $L_{2LI}$, $L_{2RI}$, $L_{2RO}$ are determined such that, as will be described later, only in a focused state are second light beams $L_{2LO}$, $L_{2LI}$, $L_{2RI}$ and $L_{2RO}$ projected on pattern forming plane 6 (see FIG. 2 and FIG. 6), overlapped with $L_{2LO}$, $L_{2LI}$, $L_{2RI}$ and $L_{2RO}$ of another one second light.

Furthermore, second computer-generated hologram 5 is not limited to the simple function of dividing a beam into two different angles $\theta_1$ and $\theta_2$ as shown in FIG. 6, and is designed to have also a beam shaper function for changing a beam shape.

Then, given this beam shaper function, second light beams $L_{2LO}$, $L_{2LI}$, $L_{2RI}$ and $L_{2RO}$ change their shapes, after being output from second computer-generated hologram 5, from the Gaussian shape (in which the shape of a cross section parallel to the traveling direction of light is a circular shape) in the stage of first light beams $L_{1L}$ and $L_{1R}$, to shapes to match the shape of the guiding pattern to be projected on pattern forming plane 6.

Figure 7:
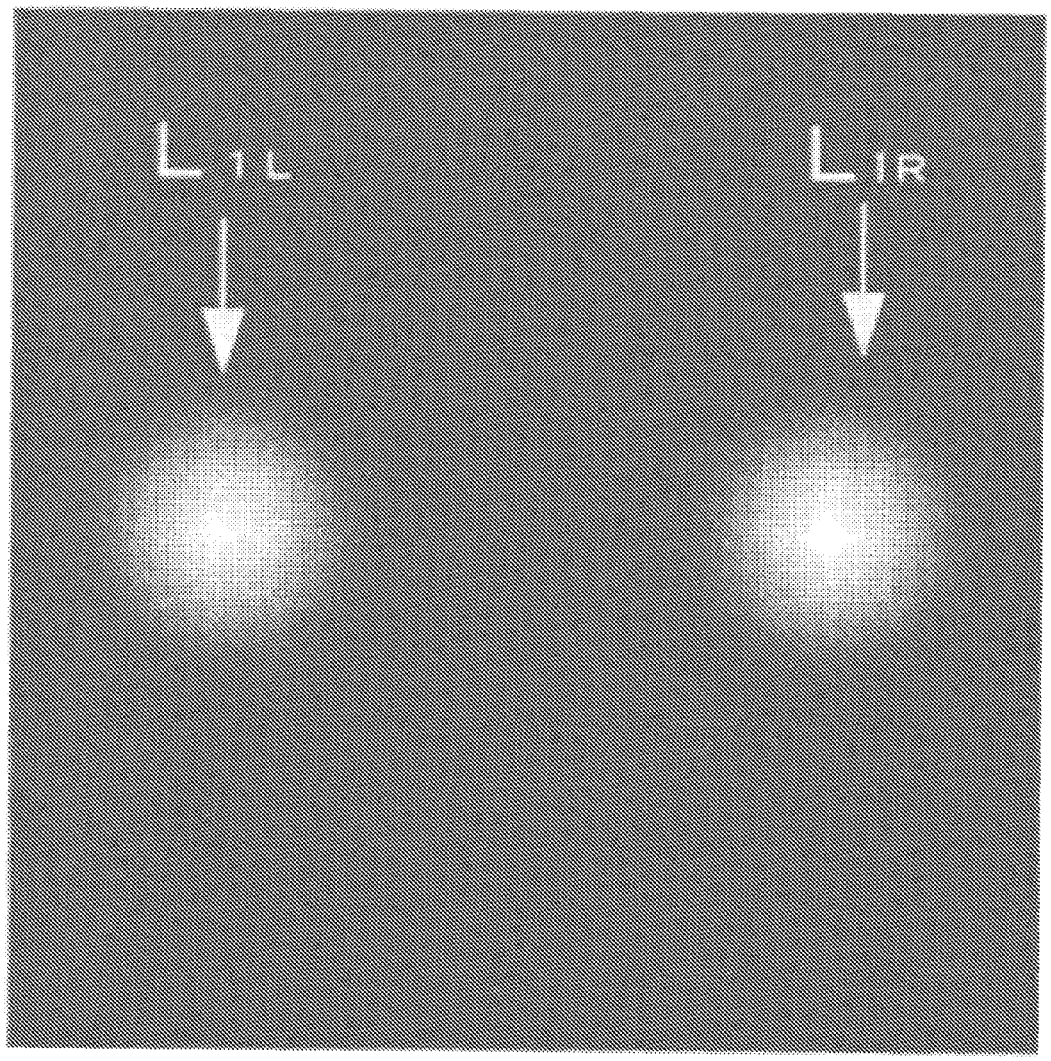
FIG. 7 shows field strength distributions of left and right first light beams, with an optical apparatus according to an embodiment of the present invention.
Figure 8:
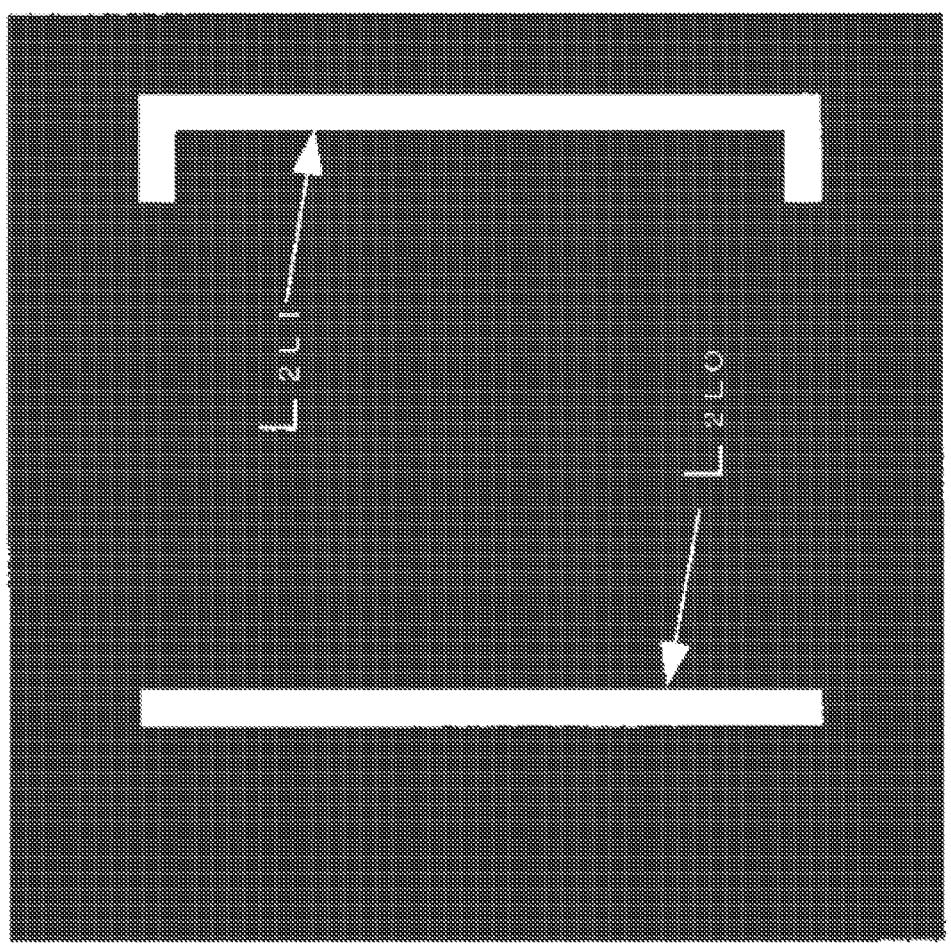
FIG. 8 shows shapes which outer left and inner left second light beams form, with an optical apparatus according to an embodiment of the present invention.

For example, in the event two Gaussian beams such as shown in FIG. 7 are incident as first light beams $L_{1L}$ and $L_{1R}$ on left and right optical function sections 5b and 5c, respectively, left optical function section 5b may be designed to produce second light beams $L_{2LO}$ and $L_{2LI}$ in shapes that can present, after being output from optical function section 5b, a pattern shape such as shown in FIG. 8 (in a Fraunhofer region). Also, in this case, right optical function section 5c may be designed to produce second light beams $L_{2RI}$ and $L_{2RO}$ in shapes that can present, after being output from optical function section 5c, a pattern shape such as shown in FIG. 9 (in a Fraunhofer region).

Figure 9:
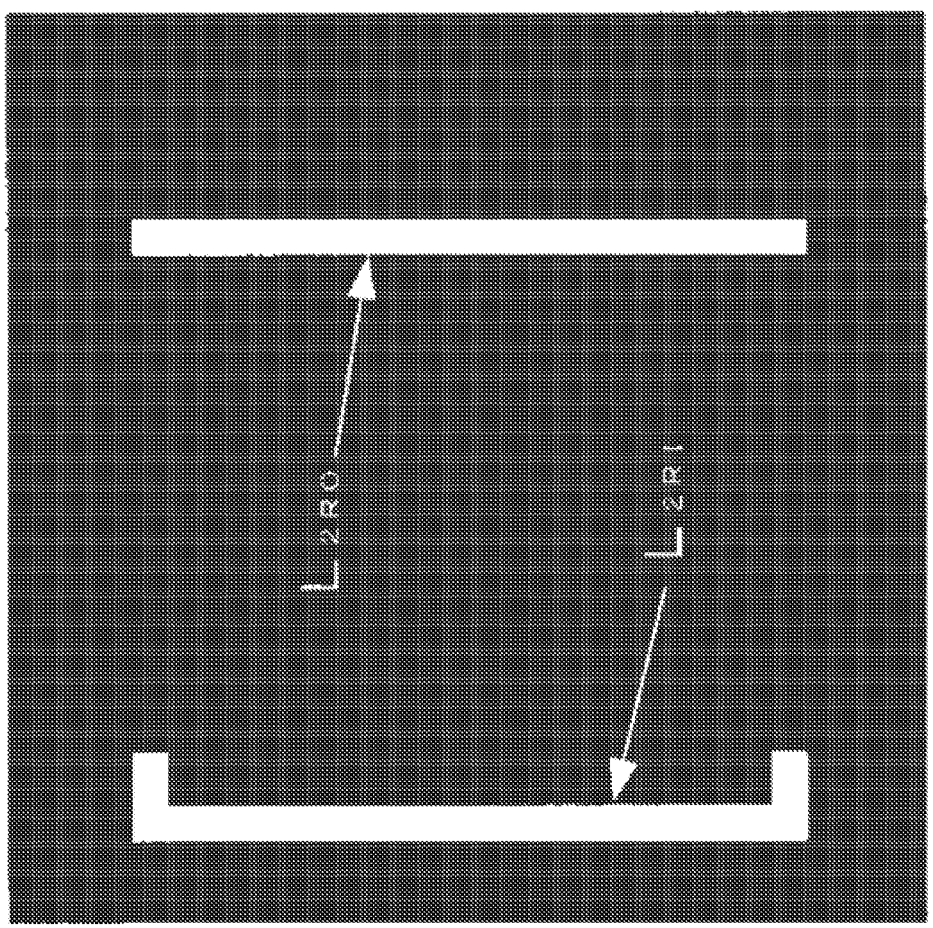
FIG. 9 shows shapes which outer left and inner left second light beams form, with an optical apparatus according to an embodiment of the present invention.

Note that the upper direction in FIG. 8 and FIG. 9 is the front side in a direction parallel to the sheets of FIG. 2 and FIG. 6, and likewise the lower direction in FIG. 8 and FIG. 9 is the rear side in a direction parallel to the sheets of FIG. 2 and FIG. 6.

Consequently, outer left second light beam $L_{2LO}$ shown in FIG. 8 has the linear shape shown in FIG. 8 that has a predetermined line width (horizontal width) and that is long in the vertical direction. Also, inner left second light beam $L_{2LI}$ shown in FIG. 8 has the shape of a reversed letter C, comprised of a long side paralleling and having the same size and the same shape as outer left light beam $L_{2LO}$, and a pair of short sides that extend parallel toward second outer left second light beam $L_{2LO}$ from both ends of the long side in the long direction. On the other hand, inner right second light beam $L_{2RI}$ shown in FIG. 9 has the shape of the letter C, which is symmetric with inner left second light beam $L_{2LI}$ shown in FIG. 8. Also, inner right second light beam $L_{2RO}$ shown in FIG. 9 has a linear shape that is symmetric with outer left second light beam $L_{2LO}$ shown in FIG. 8.

These second light beams $L_{2LO}$, $L_{2LI}$, $L_{2RI}$ and $L_{2RO}$ are output from second computer-generated hologram 5, travel respective optical paths, and then are projected as a projection pattern reflecting the shapes of second light beams $L_{2LO}$, $L_{2LO1}$, $L_{2RI}$ and $L_{2RO}$, on planar pattern forming plane 6 placed parallel to second computer-generated hologram 5, in a location on the outputting side with respect to second computer-generated hologram 5.

Now, in the event distance 1 from second computer-generated hologram 5 to pattern forming plane 6 (see FIG. 6) is an optimal distance that is equivalent to a focused state (note that this distance varies in a certain range), second light beams $L_{2LO}$, $L_{2LI}$, $L_{2RI}$ and $L_{2RO}$ are projected on pattern forming plane 6 as a projection pattern formed with total two (which is a prescribed number) pattern components that are spaced apart. In this case, outer left second light beam $L_{2LO}$ and inner right second light beam $L_{2RI}$ are projected in a state they overlap each other, thereby forming one composite pattern component. Also, in this case, inner left second light beam $L_{2LI}$ and outer right second light beam $L_{2RO}$ are projected in a state they overlap each other, thereby forming one composite pattern component. These two pattern components are symmetric.

Then, the projection pattern that is formed by the two pattern components projected in a focused state is a guide pattern of a normal shape.

Incidentally, among the focused states in which a guide pattern of a normal shape such as above is projected, the following equation holds true in the most ideal state (that is, the state in which the focus of the imaging apparatus on the object side completely matches one point on a pattern forming plane).

$$1(\tan\theta_1 - \tan\theta_2) = d \quad \text{(Equation 7)}$$

Note that 1 in equation 7 is the distance (shortest distance) from second computer-generated hologram 5 to pattern forming plane 6 shown in FIG. 2. Also, $\theta_1$ and $\theta_2$ in equation 7 are the output directions (angles) of second light beams $L_{2LO}$, $L_{2LI}$, $L_{2RI}$ and $L_{2RO}$ from second computer-generated hologram 5. Furthermore, d in equation 7 is the center-to-center distance between first light beams $L_{1L}$ and $L_{1R}$ that re incident on second computer-generated hologram 5. FIG. 6 illustrates a positional relationship between second computer-generated hologram 5 and pattern forming plane 6 in such an ideal focused state.

On the other hand, when distance 1 from second computer-generated hologram 5 to pattern forming plane 6 is a shorter or longer distance than an optimal distance which is equivalent to a focused state—in other words, in the event the distance is equivalent to an unfocused state—second light beams $L_{2LO}$, $L_{2LI}$, $L_{2RI}$ and $L_{2RO}$ are projected as a projection pattern comprised of total four pattern components separate from each other, on pattern forming plane 6. In this case, outer left second light beam $L_{2LO}$ and inner right second light beam $L_{2RI}$ are projected in a state they are separate from each other, thereby forming two separate pattern components. Also, in this case, inner left second light beam $L_{2LI}$ and outer right second light beam $L_{2RO}$ are projected in a state they are separate from each other, thereby forming two separate pattern components.

Then, the projection pattern formed with the four pattern components projected in an unfocused state makes a guide pattern having a shape to deviate from a normal shape (hereinafter "non-normal shape")—that is, a guide pattern formed with separate shapes.

Here, for a specific example of a guide pattern (hereinafter referred to as "the present specific example"), a case will be described as an example where second light beams $L_{2LO}$, $L_{2LI}$, $L_{2RI}$, and $L_{2RO}$ are output in the directions shown in FIG. 6.

Figure 10:
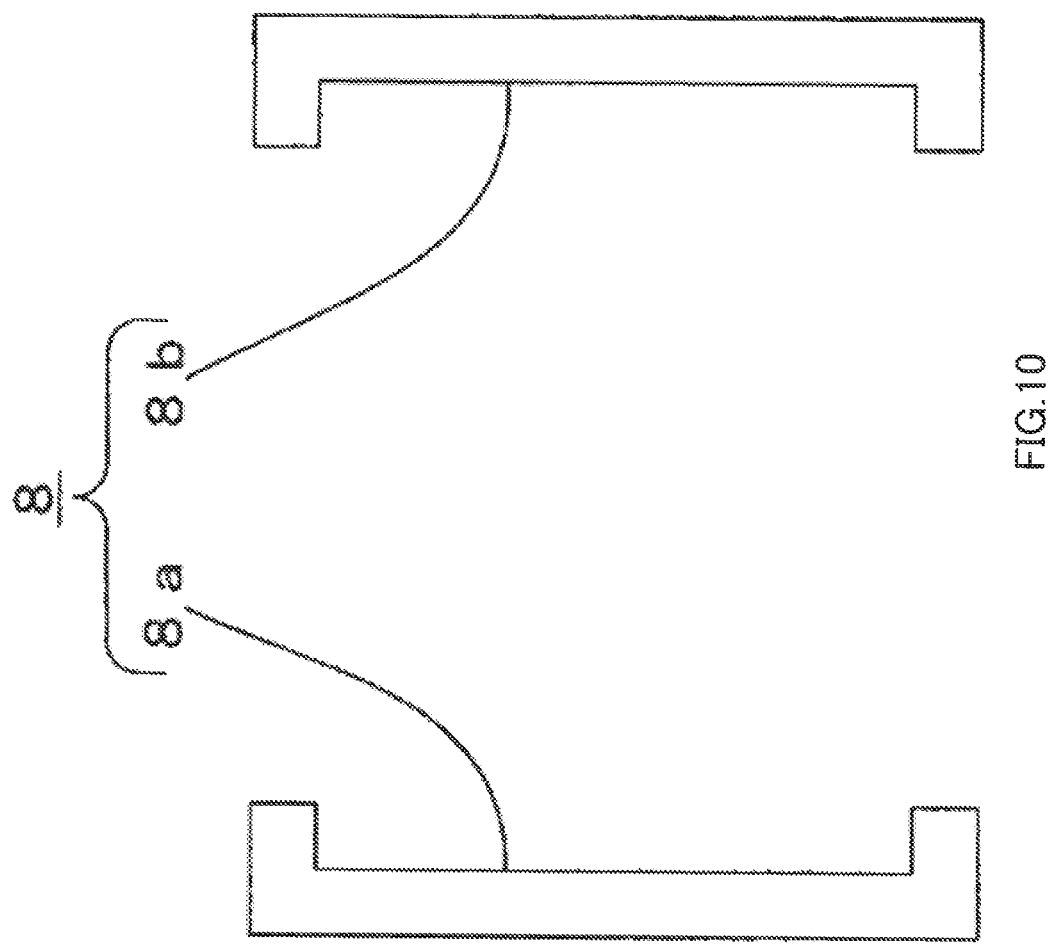
FIG. 10 is a schematic view showing an example of a guide pattern of a normal shape, with an optical apparatus according to an embodiment of the present invention.
Figure 23:
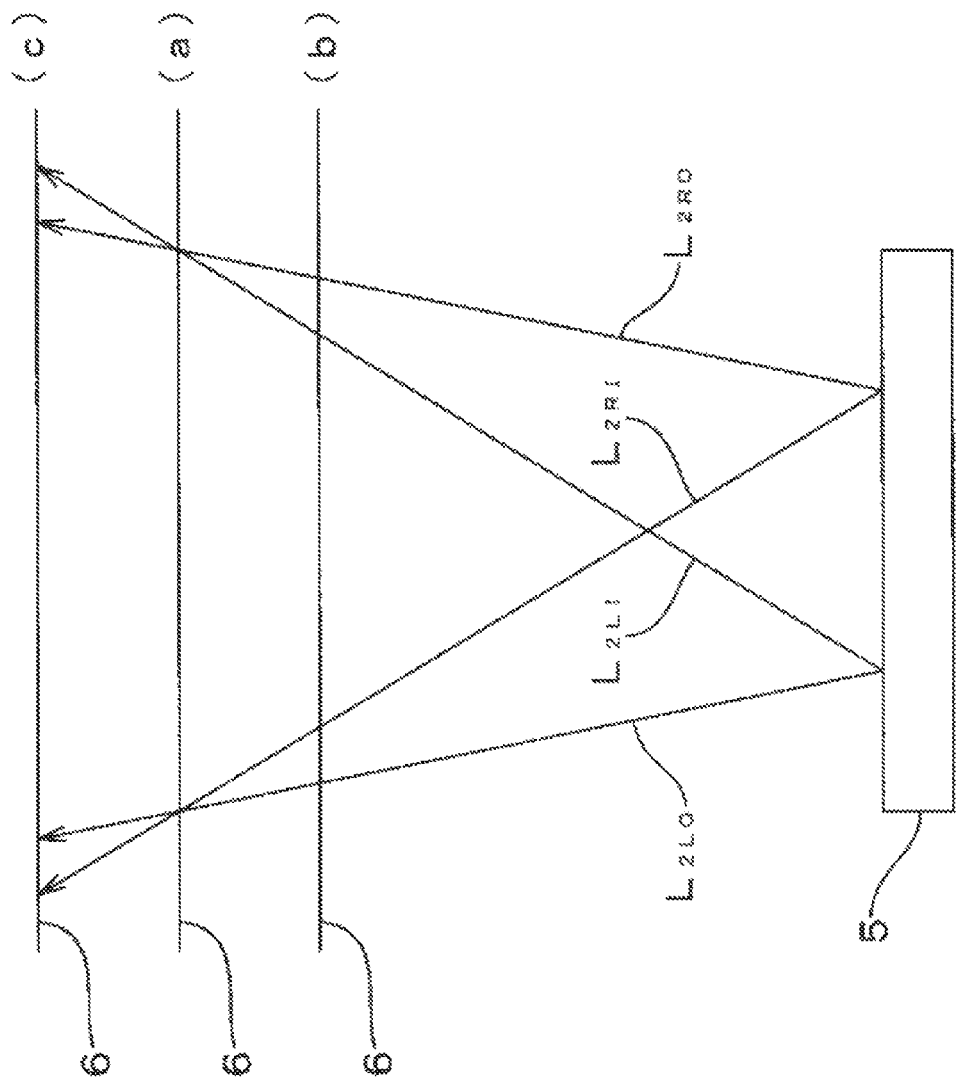
FIG. 23 is a schematic view showing a relationship between the distance from a second computer-generated hologram and a pattern forming plane, and an imaging location on a second pattern forming plane, according to an embodiment of an optical apparatus of the present invention.

First, with the present specific example, when the distance from second computer-generated hologram 5 to pattern forming plane 6 is an optimal distance—that is, in the event pattern forming plane 6 holds the positional relationship of (a) in FIG. 23 with respect to second computer-generated hologram 5—guide pattern 8 is projected as shown in FIG. 10. Guide pattern 8 shown in FIG. 10 is with left pattern component 8a, which is formed in the shape of the letter C, and right pattern component 8b, which is symmetric to left pattern component and which is formed in the shape of a reversed letter C. Here, left pattern component 8a is formed with inner right second light beam $L_{2RI}$ shown in FIG. 9 and outer left second light beam $L_{2LO}$ shown in FIG. 8 being projected on pattern forming plane 6 overlapping each other and maintaining the shapes in FIG. 8 and FIG. 9. Also, right pattern component 8b is formed with inner right second light beam $L_{2LI}$ shown in FIG. 8 and outer right second light beam $L_{2RO}$ shown in FIG. 8 being projected on pattern forming plane 6 overlapping each other and maintaining the shapes in FIG. 8 and FIG. 9. Consequently, the normal shape of the guide pattern according to the present specific example is formed like parentheses (that is, the shape of "[ ]") with a shape of letter C and a shape of a revered letter C facing each other. Note that, with the present specific example, the normal shape is by no means limited to the guide pattern shape projected in a state in which inner right second light beam $L_{2RI}$ and outer left second light beam $L_{2LO}$, or inner right second light beam $L_{2LI}$ and outer right second light beam $L_{2RO}$ overlap completely, without vertical or horizontal misalignment, and it is also to use a guide pattern shape in which these light beams are projected overlapping each other with a little misalignment, depending on design concept.

For example, such a normal shape is also possible in which the horizontal width (line width) of pattern components 8a and 8b is thicker than the ideal state shown in FIG. 10 (that is, a projection state without misalignment).

Figure 11:
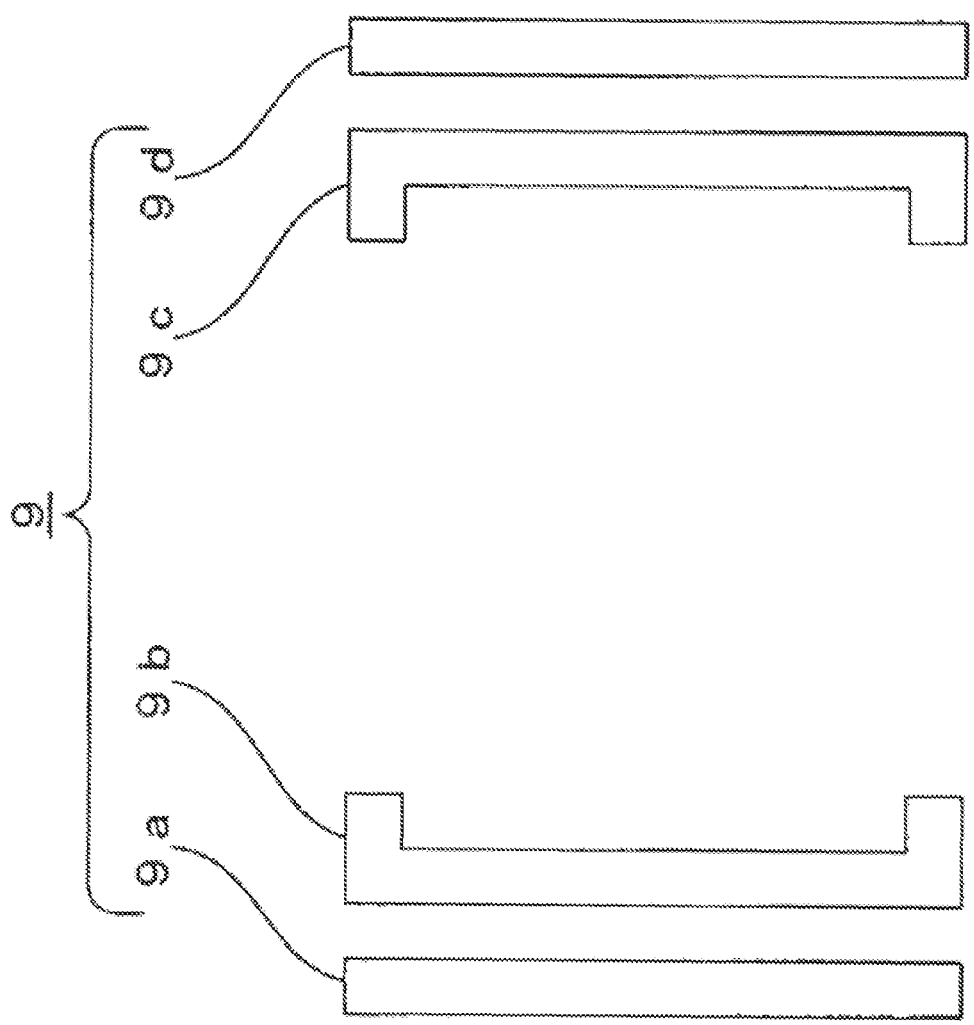
FIG. 11 is a schematic view showing an example of a guide pattern of a non-normal shape, with an optical apparatus according to an embodiment of the present invention.

Meanwhile, with the present specific example, when distance 1 from second computer-generated hologram 5 to pattern forming plane 6 is a shorter distance than an optimal distance—that is, in the event pattern forming plane 6 holds the positional relationship of (b) in FIG. 23 with respect to second computer-generated hologram 5—guide pattern 9 of a non-normal shape is projected as shown in FIG. 11. Guide pattern 9 shown in FIG. 11 is formed by providing linear-shaped pattern components 9a and 9d on the outer side of two pattern components 9b and 9c shaped like parentheses, respectively, as shown in FIG. 10. Pattern components 9a, 9b, 9c, and 9d are formed by projecting, from the left, outer left second light beam $L_{2LO}$, inner right second light beam $L_{2RI}$, inner left second light beam $L_{2LI}$, and outer right second light beam $L_{2RO}$, and these second light beams each have a shape matching the shape shown in FIG. 8 and FIG. 9.

Figure 12:
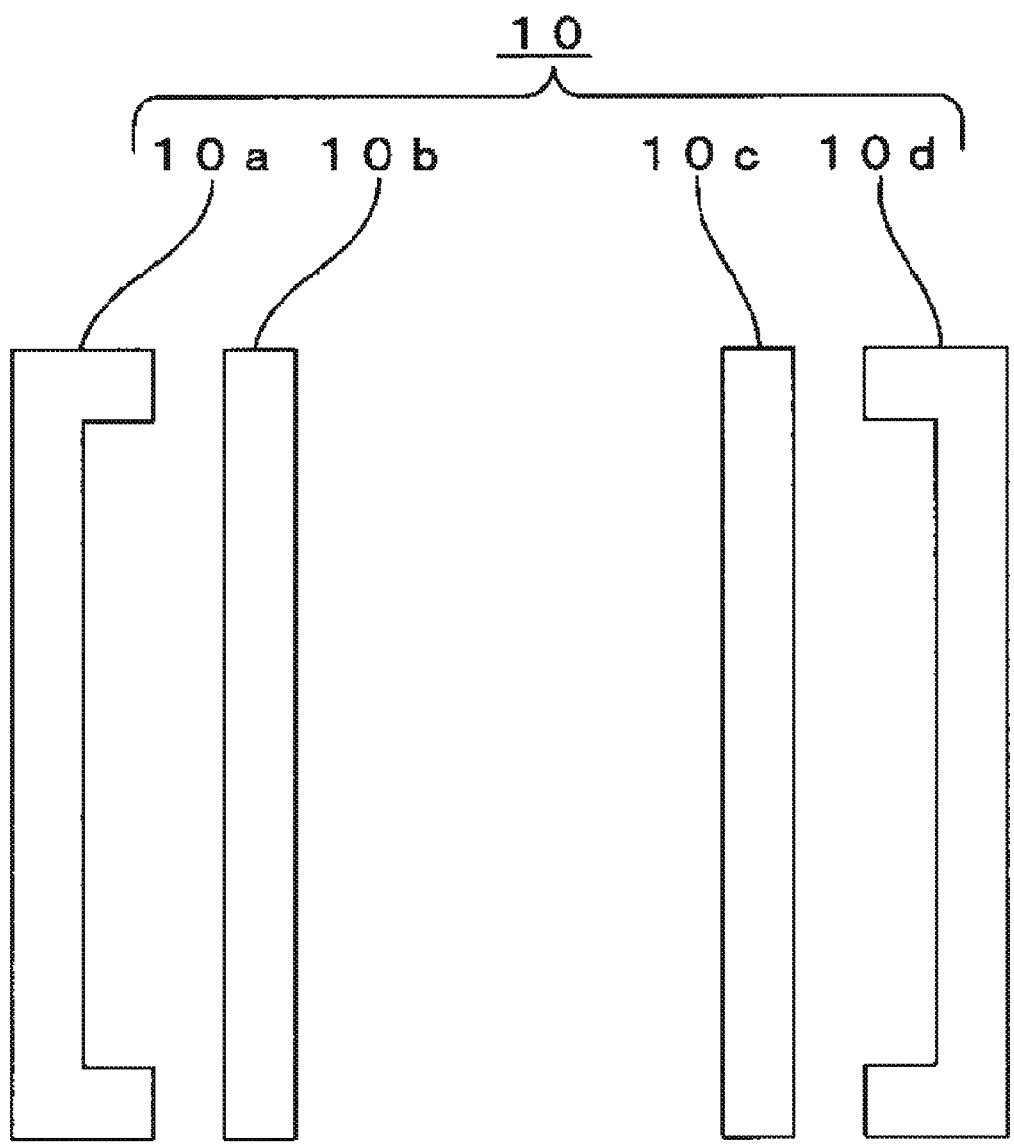
FIG. 12 is a schematic view showing an example of a guide pattern of an another non-normal shape, which differs from that of FIG. 11, with an optical apparatus according to an embodiment of the present invention.

Also, with the present specific example, when distance 1 from second computer-generated hologram 5 to pattern forming plane 6 is a longer distance than an optimal distance—that is, in the event pattern forming plane 6 holds the positional relationship of (c) in FIG. 23 with respect to second computer-generated hologram 5—guide pattern 10 of a non-normal shape is projected as shown in FIG. 12. Guide pattern 10 shown in FIG. 12 is formed by providing linear-shaped pattern components 10b and 10c on the outer side of two pattern components 10a and 10d shaped like parentheses, respectively, as shown in FIG. 10. Pattern components 10a, 10b, 10c, and 10d are formed by projecting, from the left, inner right second light beam $L_{2RI}$, outer left second light beam $L_{2LO}$, outer right second light beam $L_{2RO}$, and inner left second light beam $L_{2LI}$, and these second light beams each have a shape matching the shape shown in FIG. 8 and FIG. 9.

With this specific example, it is possible to control as to whether or not a guide pattern has a normal shape based on the line width (horizontal width) of the linear part of second light beams $L_{2LO}$, $L_{2LI}$, $L_{2RI}$, and $L_{2RO}$ extending in the vertical direction in FIG. 8 and FIG. 9. Consequently, this line width may be set to a line width to match the range of distance from second computer-generated hologram 5 to pattern forming plane 6 to be equivalent to a focused state. In the event the range of distance from second computer-generated hologram 5 to pattern forming plane 6 to provide a focused state is narrow—that is, in the event a strict focused state is required due to reasons such as that the information recognition apparatus has low information recognition performance—second computer-generated hologram 5 may be designed such that the line width of second light beams becomes small. On the other hand, in the event the range of distance from second computer-generated hologram 5 to pattern forming plane 6 to provide a focused state is wide—that is, in the event the requirement for a focused state is softened due to reasons such as that the information recognition apparatus has high information recognition performance—second computer-generated hologram 5 may be designed such that the line width of second light beams becomes large.

Second computer-generated hologram 5 to project such a guide pattern can be designed by calculating an optimal phase distribution solution using an IFTA, similar to the case of first computer-generated hologram 4.

Back to FIG. 1 and FIG. 2, furthermore, optical apparatus 1 according to the present embodiment has imaging element 14 that images a guide pattern, and in this imaging element 14, an image of a guide pattern is formed via an optical system such as a lens (not shown). This imaging element 14 may also serve as an imaging element of an imaging element of an imaging apparatus to image target pattern 7 (see FIG. 2). Also, a guide pattern may be taken in optical apparatus 1 via the optical system as for target pattern 7 (optical system constituting an imaging apparatus). Solid state imaging elements such as CCD and CMOS may be adopted as imaging element 14.

Also, as shown in FIG. 1 and FIG. 2, information processing section 15, which serves as a deciding apparatus is connected to imaging element 14. This information processing section 15 learns the number of pattern components in a guide pattern imaged by imaging element 14, through image recognition, and, based on the number of pattern components learned, determines the adequacy of the location of the imaging apparatus in the optical axis direction with respect to pattern forming plane 6. To be more specific, if the number of pattern components learned is two, the location is determined adequate, and, if the number of pattern components learned is four, the location is determined inadequate. Then, information processing section 15 outputs the determined result.

Then, in the event guide patterns 8, 9 and 10 are projected and information processing section 15 has a function of quickly identifying the shapes of guide patterns 8, 9 and 10, in addition to having the function for learning the number of pattern components, information processing section 15 preferably decides even whether the distance from the imaging apparatus to pattern forming plane 6 in the optical axis direction is an optimal distance, a distance shorter than an optimal distance or a distance longer than an optimal distance.

Also, when imaging element 14 also serves as an imaging element of an imaging apparatus, information processing section 15 may then have a function for recognizing information of a target pattern imaged by imaging element 14.

As shown in FIG. 1 and FIG. 2, imaging location information display processing section 16 is connected to information processing section 15, and this imaging location information display processing section 16 receives as input a result determined in and output from information processing section 15.

Then, imaging location information display processing section 16 shows information related to the location of the imaging apparatus in the optical axis direction with respect to pattern forming plane 6, according to the determination result received as input from information processing section 15, on a display section and so on. If the location of the imaging apparatus in the optical axis direction with respect to pattern forming plane 6 is adequate, imaging location information display processing section 16 has only to display a symbol or message to the effect that the location is adequate. On the other hand, if the location of the imaging apparatus in the optical axis direction with respect to pattern forming plane 6 is inadequate, imaging location information display processing section 16 displays a symbol or message to the effect that the location is inadequate, such as "LOCATION OF BARCODE IS NOT RIGHT," "LOCATION OF BARCODE IS LOW," "LOCATION OF BARCODE IS FAR," etc. Displaying such information allows a user to manually adjust the location of the imaging apparatus in the optical axis direction with respect to pattern forming plane 6, to an optimal location. In this case, a user may move optical apparatus 1 and imaging apparatus together, in the same direction, by moving the information recognition apparatus in the vertical direction shown in FIG. 2 and FIG. 6.

Instead of providing this imaging location information display processing section 16, it is equally possible to provide an automatic adjusting apparatus to automatically adjust the location of the imaging apparatus in the optical axis direction with respect to pattern forming plane 6 based on a decision result in information processing section 15.

Also, as with an optical system to constitute an imaging apparatus, the optical axis closest to the object (optical axis direction) is inclined with respect to the optical axis of collimation lens 3. In this case, by moving optical apparatus 1 and imaging apparatus together in a direction to adjust the distance from second computer-generated hologram 5 to pattern forming plane 6 (in the vertical direction, in FIG. 1 and FIG. 2), it is possible to adjust the location of the imaging apparatus in the optical axis direction with respect to pattern forming plane 6 in a focused state, and, consequently allow the imaging apparatus to focus upon target pattern 7.

Furthermore, in the event guide pattern 8 shown in FIG. 10 is projected, provision may be made to allow an imaging apparatus to place a focus upon target pattern 7 when target pattern 7 is placed between left and right pattern components 8a and 8b.

[Example] Next, an example of the present invention will be described.

First, with the present embodiment, as shown in FIG. 7, targeting at (that is, defining a bounding condition with) the field strength distribution (amplitude distribution) of first light beams $L_{1L}$ and $L_{1R}$ (Gaussian beams) shown in FIG. 7, the phase distribution solution (recesses and projections) of first computer-generated hologram 4 is found using an IFTA algorithm.

Figure 16:
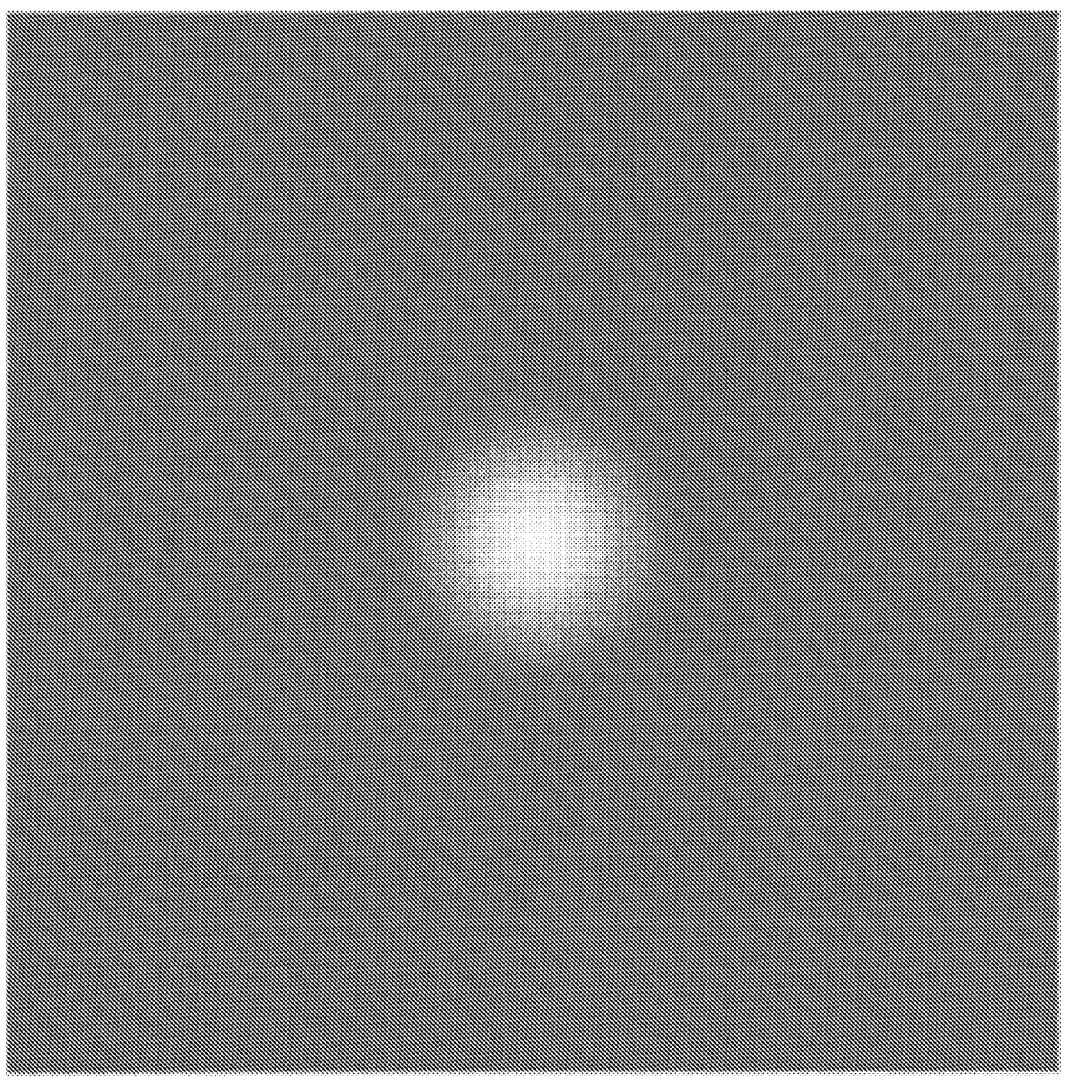
FIG. 16 shows a field strength distribution of incident light from a laser light source upon incidence on a first computer-generated hologram, according to an example of the present invention.
Figure 17:
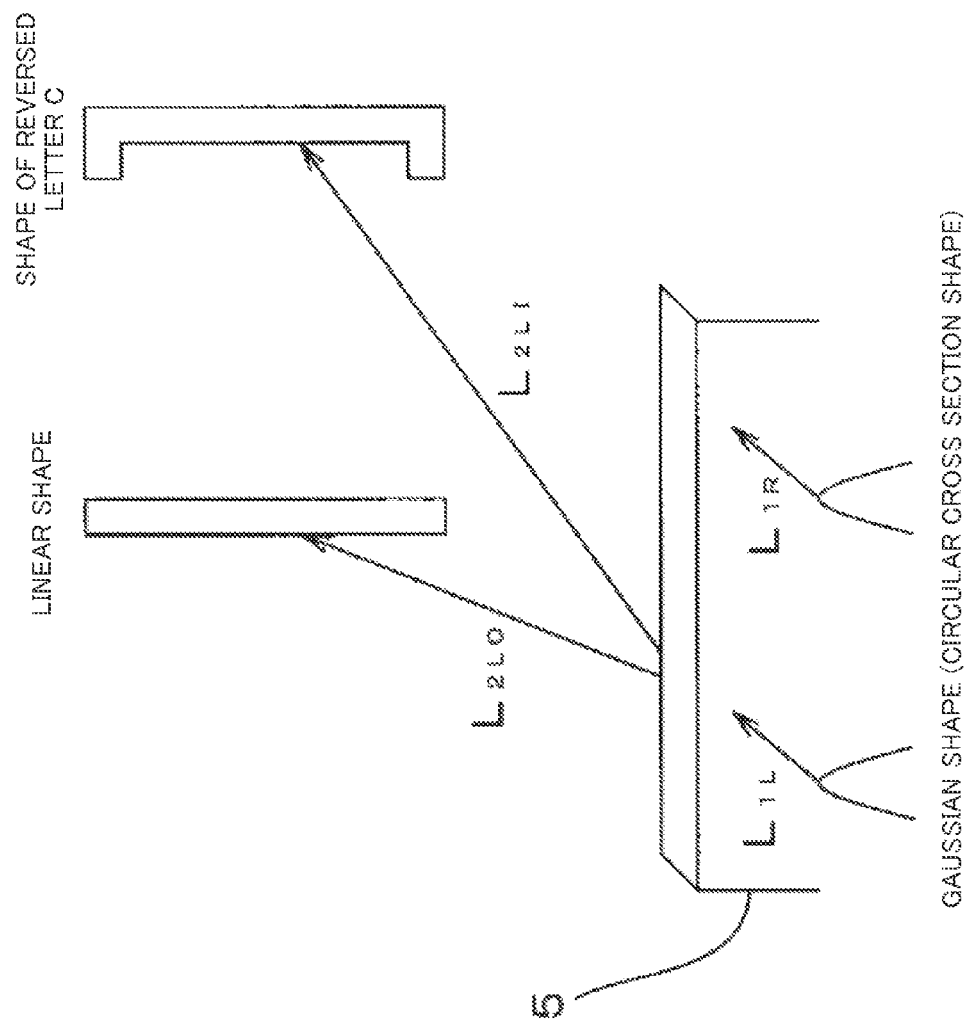
FIG. 17 is a conceptual diagram showing a function of changing a beam shape in a second computer-generated hologram, according to an example of the present invention.

Note that the field strength distribution of FIG. 7 is assumed as a field strength distribution that is achieved at the location a 25-mm propagation from (ahead of) first computer-generated hologram 4, under the conditions that the mode field radius is 500 μm and the center-to-center distance between light beams $L_{1L}$ and $L_{1R}$ is 3.0 mm. Incidentally, the mode field radius of 500 μm is assumed to be the same as the radius of incident light (Gaussian beam) from laser light source 2 (see FIG. 16) upon incidence on first computer-generated hologram 4. Also, laser light source 2 is assumed to be an LD of NA=0.6, approximately, outputting a red light of λ=650 nm. Furthermore, collimation lens 3 is assumed to be a non-spherical lens having a focal distance of approximately 0.64 mm, which can make input light from laser light source 2 a Gaussian beam having a 500 μm radius. Note that the phase distribution of laser light upon output from laser light source 2 is undefined and is not taken into account as a bounding condition of an IFTA algorithm.

Furthermore, the basic configuration of a hologram is that the number of pixels is 1024 (vertical)×1024 (horizontal), the size of a pixel is 5 μm, and the number of steps is 16. In equation 6 given earlier, first light beams $L_{1L}$ and $L_{1R}$ are regarded as ±first order light beams, and, if a pixel size of 5 μm is substituted in the place of Λ, the output angle (diffraction angle) of first light beams $L_{1L}$ and $L_{1R}$ becomes 7.47°.

Then, under these assumptions, an angular spectrum propagation method is used for the propagation calculation of first light beams $L_{1L}$ and $L_{1R}$, and an iterative calculation is carried out based on the GerchBerg-Saxton algorithm.

Figure 13:
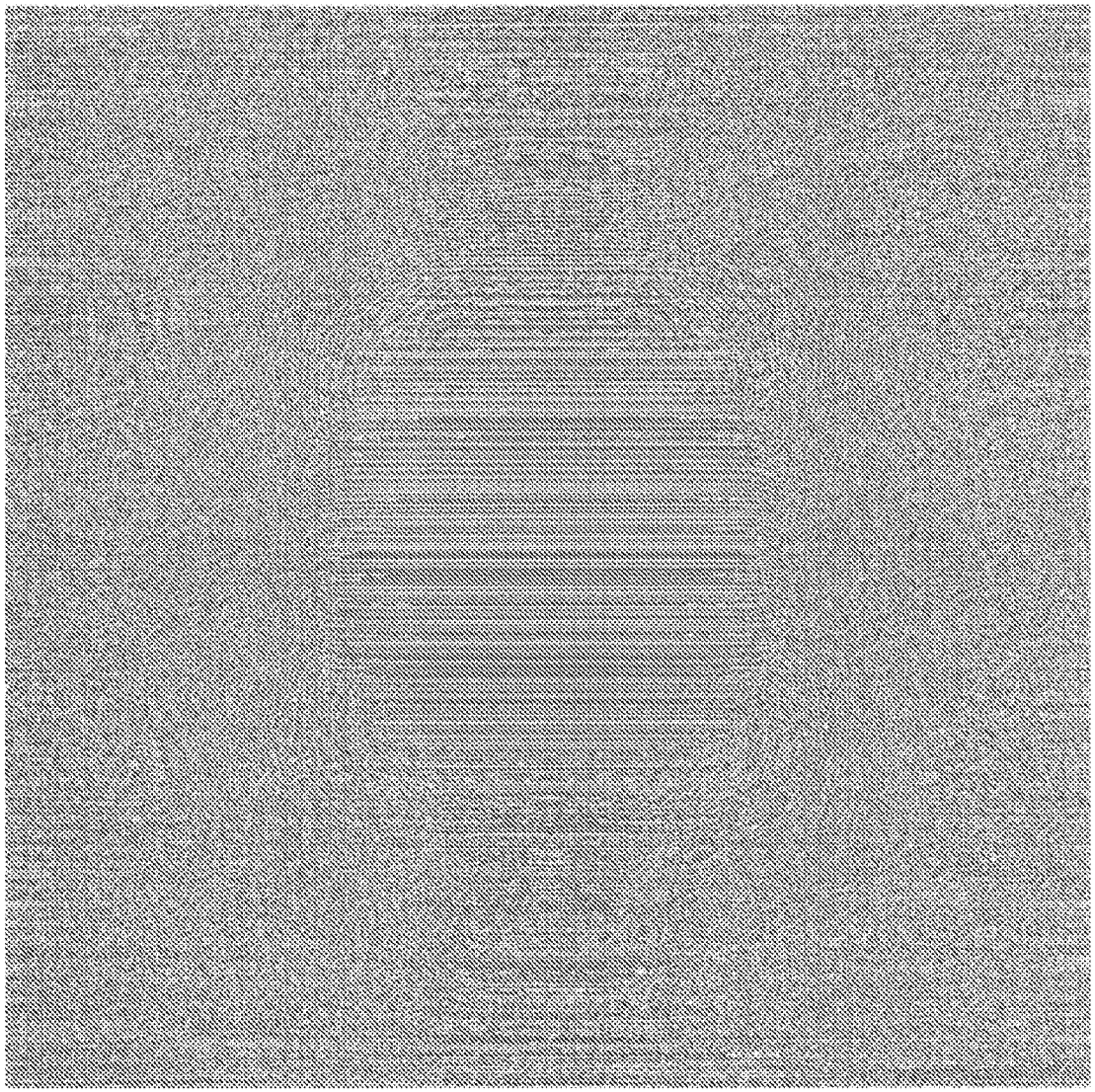
FIG. 13 is a plan view showing a phase distribution solution with a first computer-generated hologram, according to an example of an embodiment of the present invention.

The phase distribution solution of first computer-generated hologram 4 acquired by this iterative calculation is as shown in FIG. 13. Then, the field strength distributions of first light beam $L_{1L}$ and $L_{1R}$ at the location 25 mm apart from first computer-generated hologram 4 acquired in this way, are as shown in FIG. 14.

Figure 14:
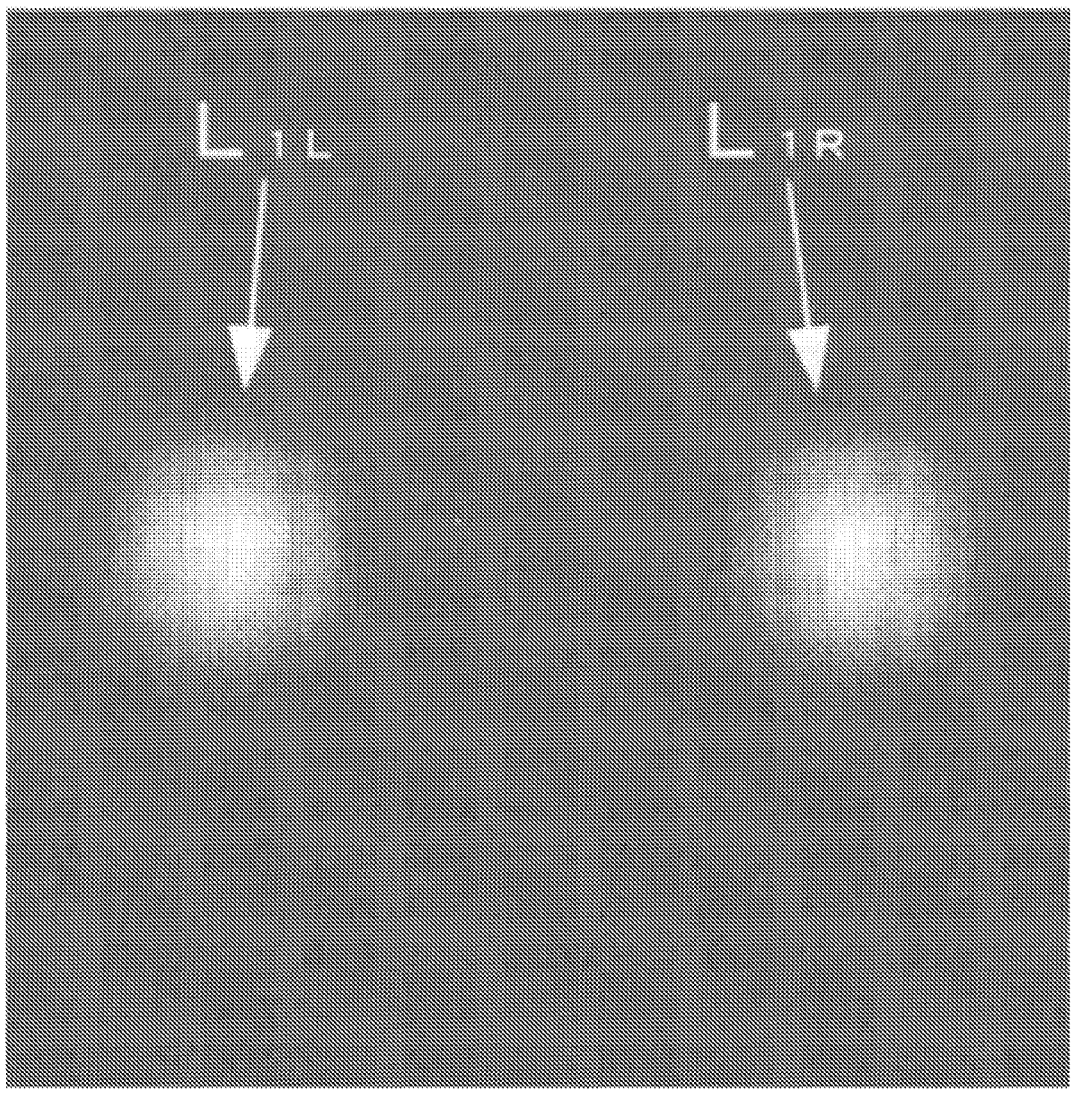
FIG. 14 shows field strength distributions with left and right first light beams, realized by a first computer-generated hologram having the phase distribution solution of FIG. 13.

There is some noise in the field strength distributions of FIG. 14 compared to the target field strength distributions shown in FIG. 7, but the field strength distributions are nearly as targeted.

Next, with the present embodiment, a phase distribution solution (recesses and projections) of second computer-generated hologram 5 is determined using an IFTA algorithm.

However, note that second computer-generated hologram 5 has a pair of left and right optical function sections 5b and 5c, so that, by carrying out two kinds of IFTA-based iterative calculations, the phase distribution solution of left optical function section 5b and the phase distribution solution of right optical function section 5c are determined separately.

Now, to find the phase distribution solution of optical function section 5b, a field strength distribution in an area to match ¼ of the entire target field strength distributions in FIG. 7, from the center of left first light beam $L_{1L}$ in the field strength distributions of FIG. 7, is picked up. Regarding the whole of the field strength distributions of FIG. 7 as an image of 1024 pixels (vertical)×1024 pixels (horizontal), the field strength distribution to be picked up then is a field strength distribution in an image area of 1024 pixels (vertical)×1024 pixels (horizontal) from the center of first light beam $L_{1L}$.

Next, the detected field strength distribution is changed to a field strength distribution in an area of 1024 pixels (vertical)×1024 pixels (horizontal) by doubling the cell. The field strength distribution resulting from this change is as shown in FIG. 15.

Figure 15:
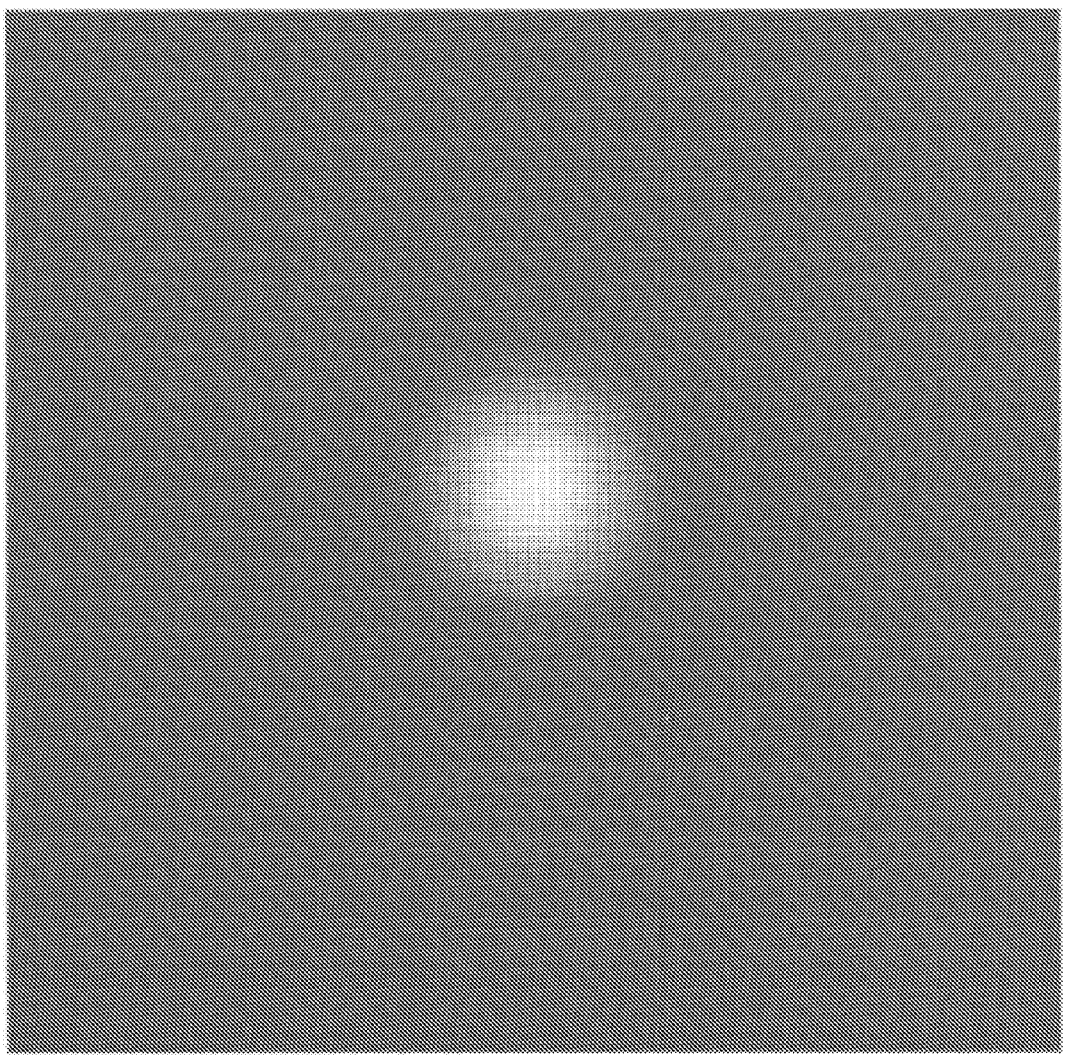
FIG. 15 shows a field strength distribution of a left first light beam picked up to design a left optical function section in a second computer-generated hologram, according to an example of the present invention.

Here, left optical function section 5b is supposed to be placed in a location 25 mm apart from first computer-generated hologram 4, so that left optical function section 5b is assumed to be provided immediately after first light beam $L_{1L}$ shown in the field strength distribution of FIG. 15.

Furthermore, left optical function section 5b is assumed to be configured such that the number of pixels is 1024 (vertical)×1024 (horizontal), the size of a pixel is 5 μm, and the number of steps is 16.

Furthermore, second light beams $L_{2LO}$ and $L_{2LI}$ output from left optical function section 5b are assumed to be changed into the shapes shown in FIG. 8, which have target field strength distributions, at locations a certain distance apart from left optical function section 5b. These locations are assumed to be a certain distance apart, based on the assumption that second light beams $L_{2LO}$ and $L_{2LI}$ are changed into the shapes in FIG. 8 in a Fraunhofer region. This change of beam shapes is as shown in FIG. 7.

Figure 18:
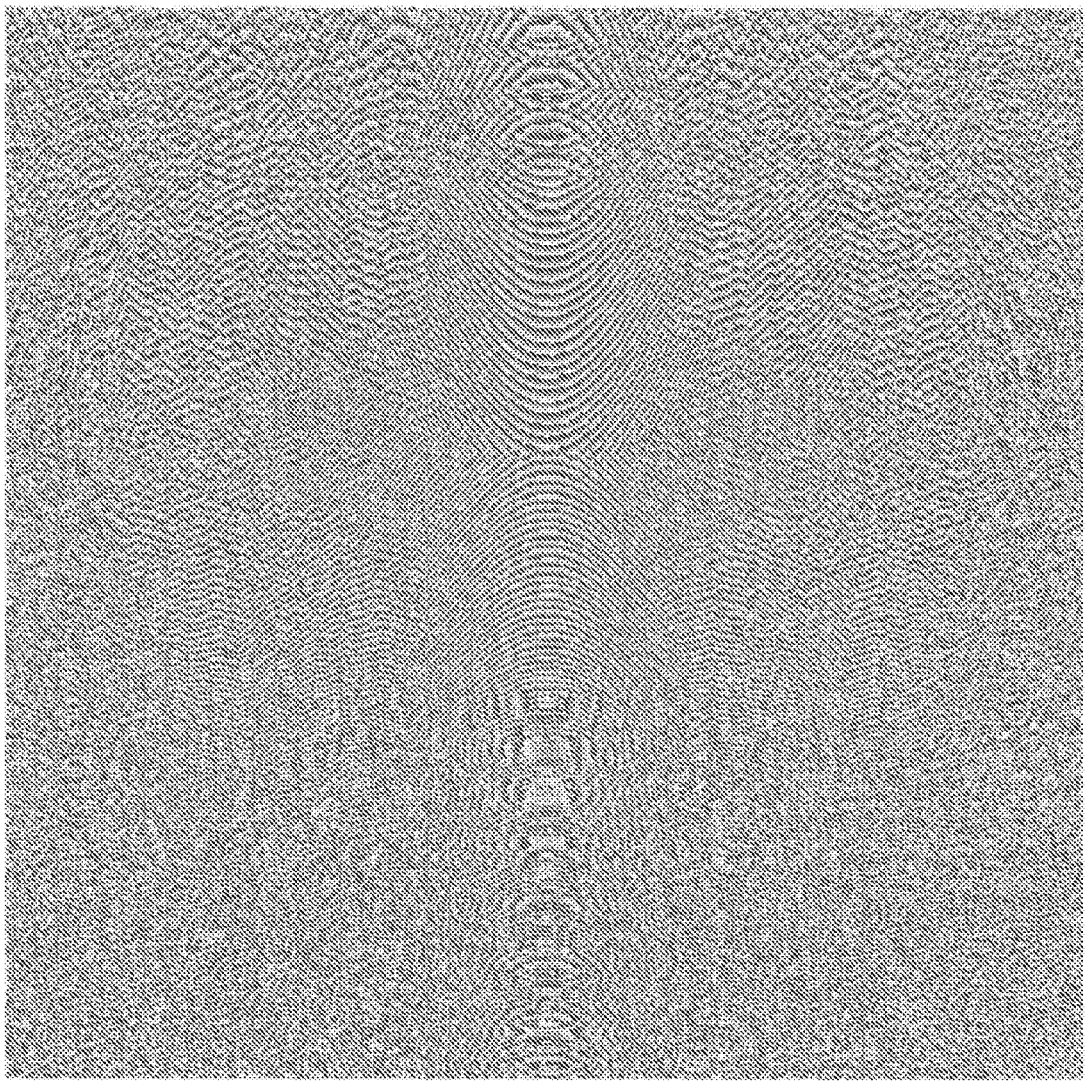
FIG. 18 is a plan view showing a phase distribution solution in a left optical function section, according to an example of the present invention.
Figure 19:
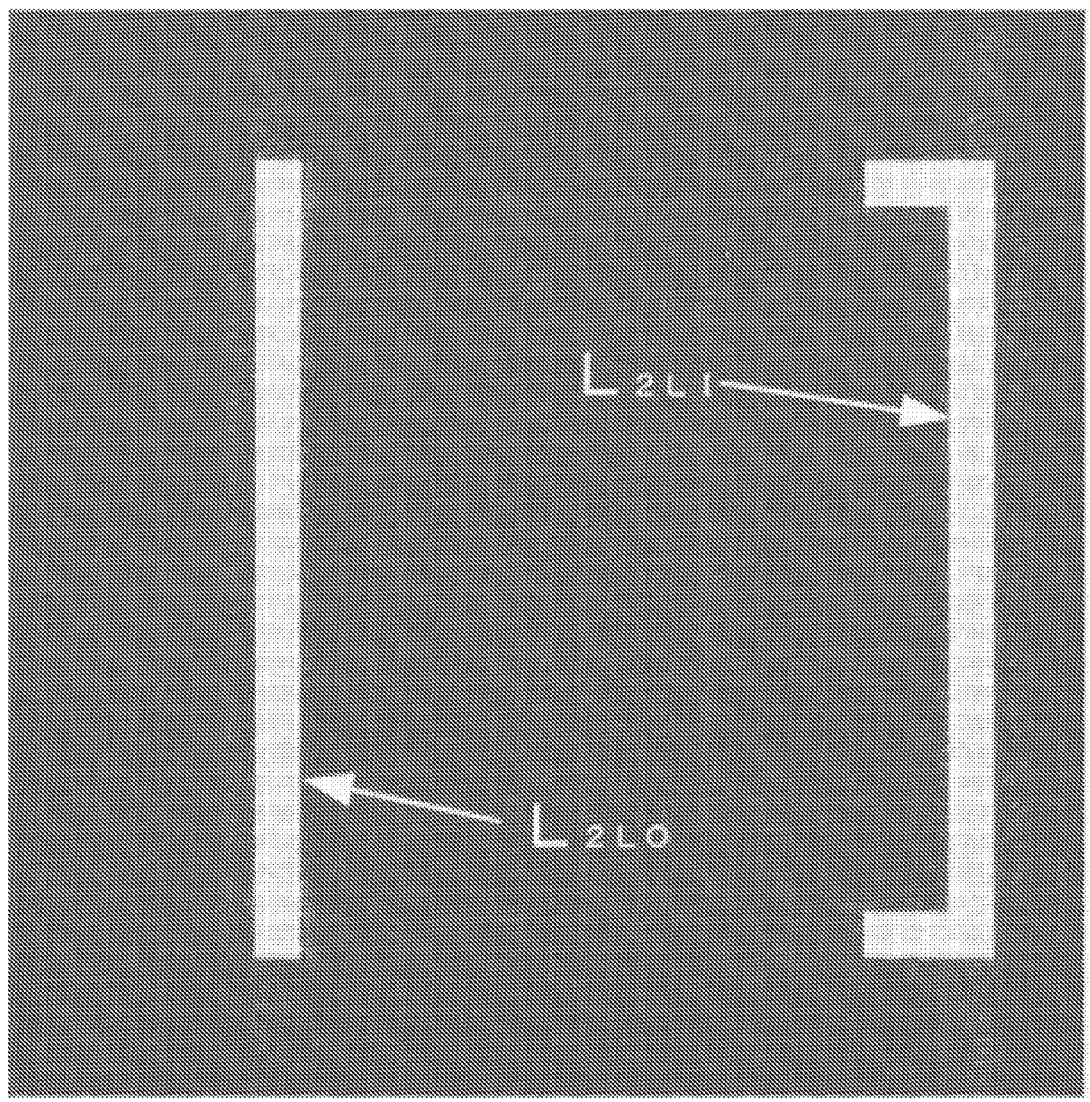
FIG. 19 shows a field strength distribution of a second light beam realized by a left optical function section having the phase distribution solution of FIG. 18.

Under these assumptions, the phase distribution solution of left optical function section 5b acquired by an IFTA-based iterative calculation is as shown in FIG. 18. A Fourier propagation calculation is used for the calculation of light propagation. Then, the phase distributions of second light beams $L_{2LO}$ and $L_{2LI}$ output from left optical function section 5b acquired in this way, are as shown in FIG. 19. The field strength distributions in FIG. 19 are almost the targeted distributions and nearly match those shown in FIG. 8. Also, the phase distribution solution of FIG. 18 gives a diffraction efficiency of 87.8% and an SNR of 33.6 dB. Also, using FIG. 6 for an explanation, the output angles of second light beams $L_{2LO}$ and $L_{2LI}$ are $\theta_1=5.84°$ and $\theta_2=3.74°$.

Next, to determine the phase distribution solution of right optical function section 5c, the same technique as with left optical function section 5b is used.

Now, a field strength distribution in an area to match ¼ of the entire target field strength distributions in FIG. 7, from the center of right first light beam $L_{1R}$ in the field strength distributions of FIG. 7, is picked up Next, the detected field strength distribution is changed to a field strength distribution in an area of 1024 pixels (vertical)×1024 pixels (horizontal) by doubling the cell. The field strength distribution resulting from this change is as shown in FIG. 20.

Figure 20:
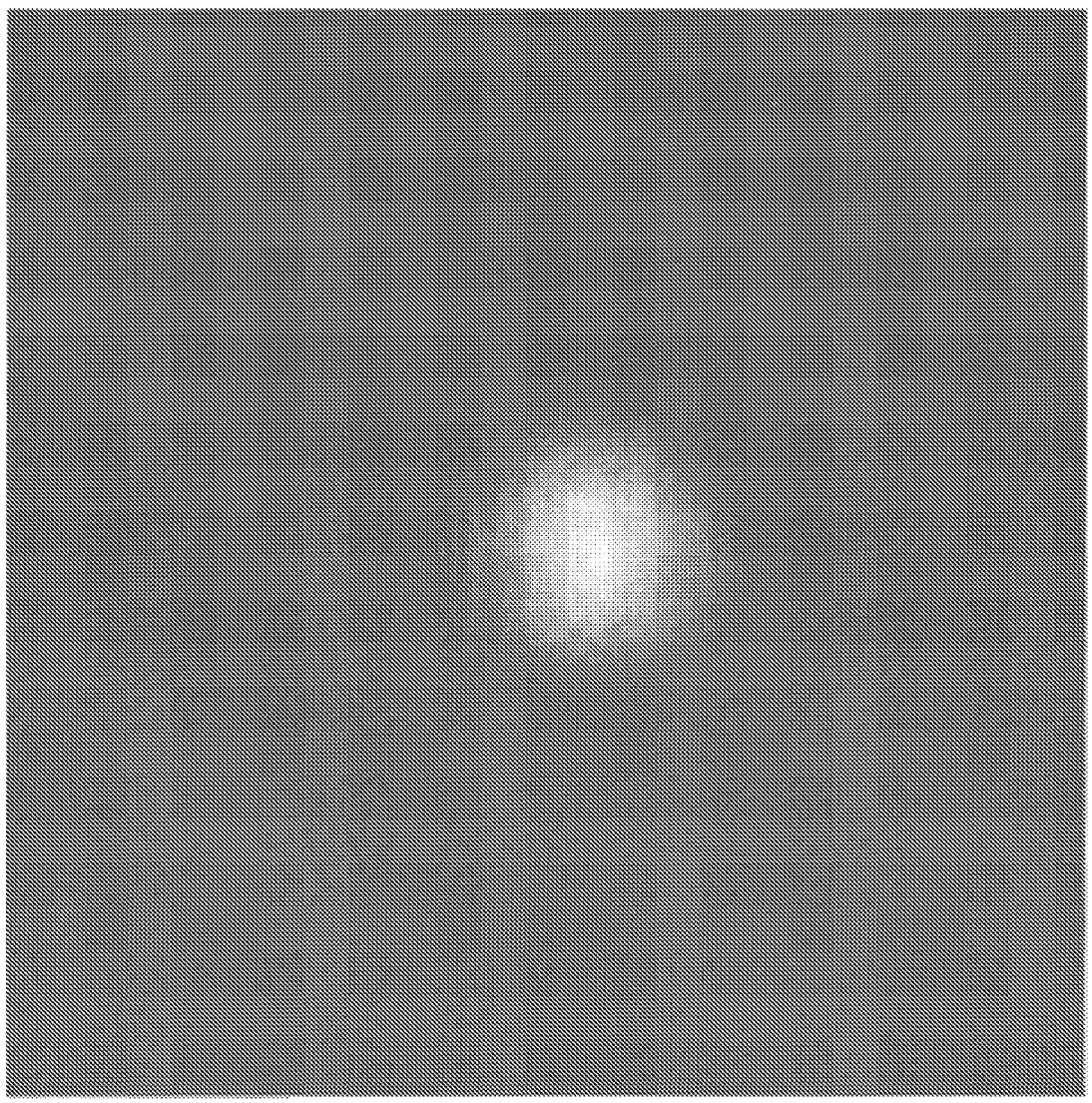
FIG. 20 shows a field strength distribution of a right first light beam picked up to design a right optical function section in a second computer-generated hologram, according to an example of the present invention.

Here, right optical function section 5c is supposed to be placed in a location 25 mm apart from first computer-generated hologram 4, so that right optical function section 5c is assumed to be provided immediately after first light beam $L_{1R}$ shown in the field strength distribution of FIG. 20.

Furthermore, right optical function section 5c is assumed to be configured such that the number of pixels is 1024 (vertical)×1024 (horizontal), the size of a pixel is 5 μm, and the number of steps is 16.

Furthermore, second light beams $L_{2RO}$ and $L_{2RI}$ output from right optical function section 5c are assumed to be changed into the shapes shown in FIG. 9, which have target field strength distributions, at locations a certain distance apart from right optical function section 5c. These locations are assumed to be a certain distance apart, based on the assumption that second light beams $L_{2RO}$ and $L_{2RI}$ are changed into the shapes in FIG. 9 in a Fraunhofer region.

Figure 21:
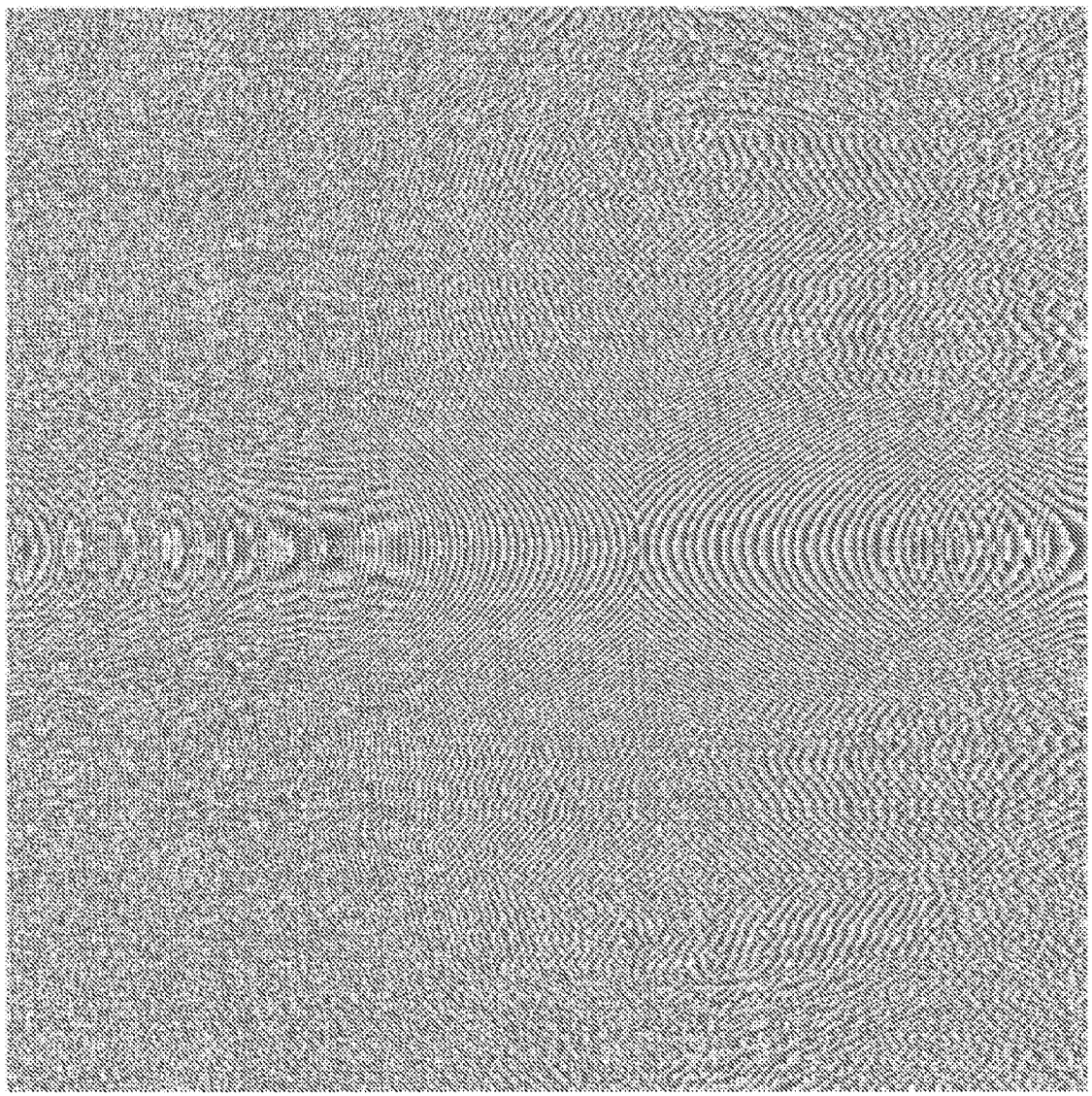
FIG. 21 is a plan view showing a phase distribution solution of a right optical function section, according to an example of the present invention.
Figure 22:
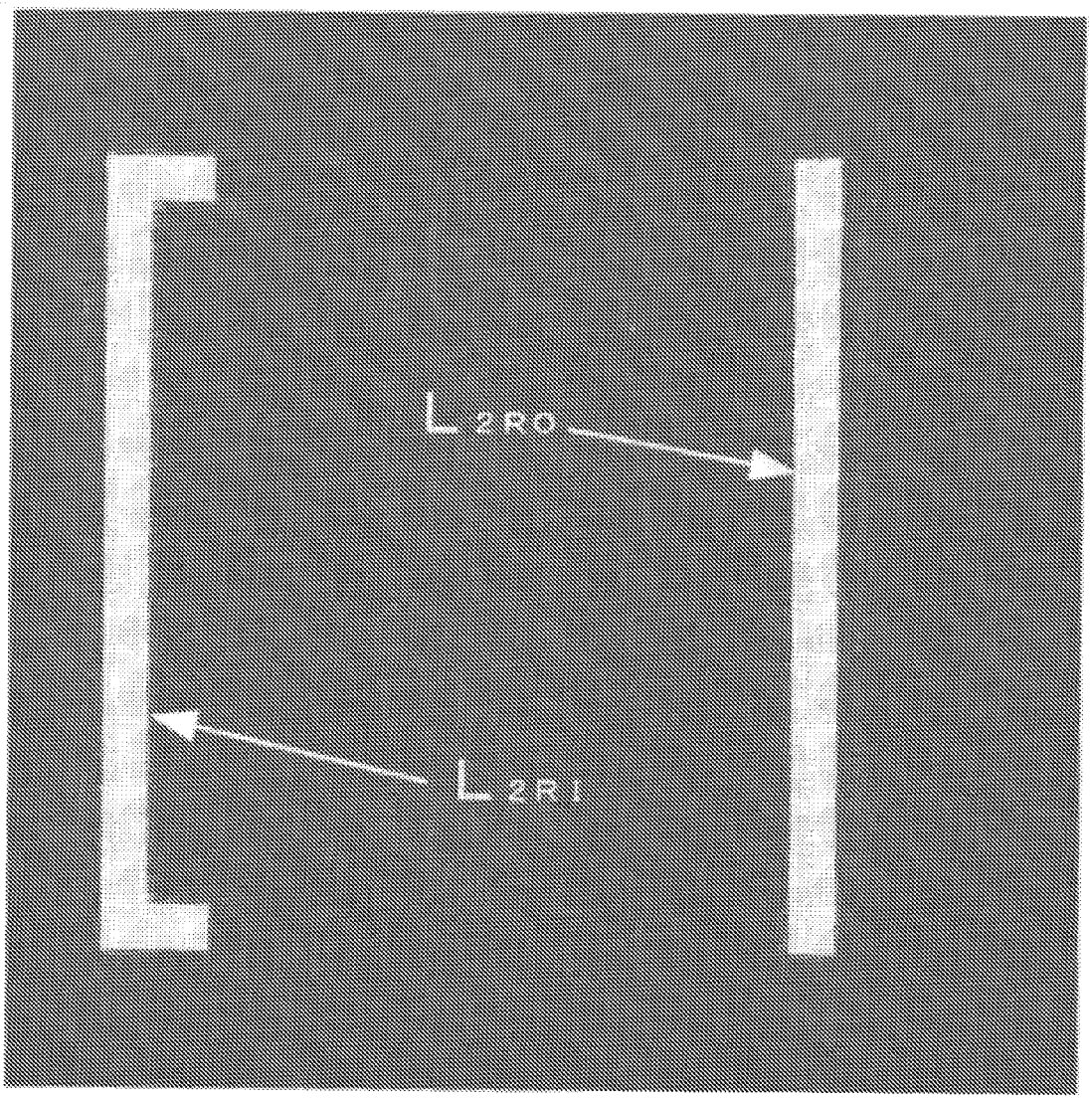
FIG. 22 shows a field strength distribution of a second light beam realized by a left optical function section having the phase distribution solution of FIG. 21.

Under these assumptions, the phase distribution solution of right optical function section 5c acquired by an IFTA-based iterative calculation is as shown in FIG. 21. A Fourier propagation calculation is used for the calculation of light propagation. Then, the phase distributions of second light beams $L_{2RO}$ and $L_{2RI}$ output from right optical function section 5c acquired in this way, are as shown in FIG. 22. The field strength distributions in FIG. 22 are almost the targeted distributions and nearly match those shown in FIG. 9. Also, the phase distribution solution of FIG. 21 gives a diffraction efficiency of 88.6% and an SNR of 33.8 dB. This suggests that, as left and right optical function sections 5b and 5c, nearly symmetric optical function sections 5b and 5c are acquired.

Then, with optical apparatus 1 having first computer-generated hologram 4 and second computer-generated hologram 5 acquired as described above, first, laser light L output from laser light source 2 is collimated through collimation lens 3 and changed to a Gaussian beam having a mode field diameter with a 500 μm radius. Next, laser light L after the collimation is divided into first light beams $L_{1L}$ and $L_{1R}$ of approximately equal powers, through first computer-generated hologram 4, and output at equal angles between the left and right by the diffraction effect of first computer-generated hologram 4. Next, first light beams $L_{1L}$ and $L_{1R}$ output from first computer-generated hologram 4 are divided into second light beams $L_{2LO}$, $L_{2LI}$, $L_{2RI}$ and $L_{2RO}$ through second computer-generated hologram 5 and output. Then, second light beams $L_{2LO}$, $L_{2LI}$, $L_{2RI}$ and $L_{2RO}$ output from second light second computer-generated hologram 5 are changed into predetermined shapes (see FIG. 8 and FIG. 9) to match a guide pattern, projected on patter forming plane 6, and form a guide pattern. If a focused state is provided at this time, guide pattern 8 of a normal shape is projected as shown in FIG. 10. On the other hand, in an unfocused state, guide pattern 9 or 10 of a non-normal shape, with separate components, is projected, as shown in FIG. 11 or FIG. 12. Then, by identifying the shape of this guide pattern thorough image recognition, it is possible to decide whether the position of the imaging apparatus with respect to pattern forming plane 6 is adequate.

As described above, with the present invention, laser light output from one laser light source 2 can be divided into second light beams $L_{2LO}$, $L_{2LI}$, $L_{2RI}$ and $L_{2RO}$ through collimation lens 3, first computer-generated hologram 4 and second computer-generated hologram 5, and, by projecting these second light beams $L_{2LO}$, $L_{2LI}$, $L_{2RI}$ and $L_{2RO}$ upon pattern forming plane 6, it is possible to form a guide pattern whereby whether or not a focused state is achieved can be determined. As a result of this, it is possible to reduce the number of light sources compared to heretofore. Furthermore, reducing the number of light sources naturally results in reducing the space for providing light sources, so that miniaturization is made possible.

The present invention, however, is by no means limited to the embodiment and example described herein, and various modifications are possible if necessary.

For example, it is equally possible to provide a diffraction grating to provide the same diffraction effect as by first computer-generated hologram 4, instead of providing first computer-generated hologram 4.

Also, a normal-shaped guide pattern is by no means limited to the one shown in FIG. 10, and, for example, a shape in which two arc-shaped pattern components are placed to face each other (that is, the shape of "( )"), a shape in which a pattern component formed in the shape of an inequality symbol "<" and a pattern component also formed in the shape of an inequality symbol ">" are placed to face each other (that is, the shape of "< >"), and suchlike shapes are possible. Furthermore, the number of pattern components to constitute a normal-shaped guide pattern is not limited to two. In addition, the shape of a plurality of pattern components to constitute a normal-shaped guide pattern is not limited to ones having linear parts, and may have the shape of a polygon other than a linear shape.

The invention claimed is:

1. An optical apparatus that, upon imaging a target pattern that comprises characters, numeric values, numbers, or an arrangement of these and carries predetermined information, by means of an imaging apparatus, projects on a pattern forming plane where the target pattern is formed a guide pattern that is projected to show a normal shape appearance on the pattern forming plane only when the imaging apparatus is in a focused state with respect to the pattern forming plane, as a light projection pattern for determining a location of the imaging apparatus in an optical axis direction with respect to the pattern forming plane, the optical apparatus comprising:

one light source that outputs light;
a collimation lens that collimates the light output from the light source;
a diffractive optical element that divides the light collimated through the collimation lens into a plurality of first light beams to travel in varying directions; and
a computer-generated hologram that divides the plurality of first light beams each into a plurality of second light beams, and outputs these plurality of second light beams of each first light beam in varying directions such that the second light beams of each first light beam are projected on the pattern forming plane in a state said second beams of each first light beam overlap the second beams of another first light beam only in the focused state, wherein:
the second light beams of each first light beam are formed to show a predetermined shape to match the guide pattern after being output from the computer-generated hologram; and
the guide pattern is formed when the second light beams of each first light beam are projected on the pattern forming plane.

2. The optical apparatus according to claim 1, wherein the guide pattern is projected as a projection pattern comprised of a predetermined number of separate pattern components in the focused state and projected as a projection pattern comprised of a greater number of separate pattern components than the predetermined number of separate components.

3. The optical apparatus according to claim 1, wherein the shapes and output directions of the second light beams of each first light beam allow the shape of the guide pattern to vary between a case where a distance from the computer-generated hologram to the pattern forming plane is an optimal distance, which is equivalent to the focused state, a case where the distance is a shorter distance than the optimal distance, and a case where the distance is a longer distance than the optimal distance.

4. The optical apparatus according to claim 1, wherein the predetermined shape which the second light beams of each first light beam show is a linear shape at least a part of which has a predetermined line width.

5. The optical apparatus according to claim 4, wherein the line width is adjusted to a value to match a range of the distance from the computer-generated hologram to the pattern forming plane.

6. The optical apparatus according to claim 1, wherein the diffractive optical element divides the light collimated through the collimation lens into two first light beams.

7. The optical apparatus according to claim 6, wherein the computer-generated hologram divides the two first light beams each into two second light beams.

8. The optical apparatus according to claim 1, wherein the diffractive optical element is a computer-generated hologram.

9. The optical apparatus according to claim 1, further comprising:
an imaging element that images the guide pattern; and
a deciding apparatus that decides whether the location of the imaging apparatus in the optical axis direction with respect to the pattern forming plane is adequate, based on the guide pattern imaged by the imaging element, and outputs a decision result.

10. The optical apparatus according to claim 1, wherein the target pattern is a one dimensional code or a two dimensional code.

* * * * *